(12) United States Patent
Imine

(10) Patent No.: US 7,911,649 B2
(45) Date of Patent: Mar. 22, 2011

(54) IMAGE OUTPUTTING APPARATUS AND CONTROL METHOD THEREOF WITH OUTPUT OF COLOR COPY DESPITE SETTING FOR BLACK AND WHITE COPY

(75) Inventor: Ryotaro Imine, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 502 days.

(21) Appl. No.: 12/114,440

(22) Filed: May 2, 2008

(65) Prior Publication Data

US 2008/0278766 A1 Nov. 13, 2008

(30) Foreign Application Priority Data

May 8, 2007 (JP) .................................. 2007-123663

(51) Int. Cl.
*H04N 1/50* (2006.01)
*G06K 15/02* (2006.01)

(52) U.S. Cl. ........ 358/2.1; 358/1.13; 358/1.14; 358/501

(58) Field of Classification Search .................... 358/1.9, 358/2.1, 3.24, 1.13, 1.14, 501, 530; 399/82, 399/85

See application file for complete search history.

(56) References Cited

U.S. PATENT DOCUMENTS

| 6,891,636 B1 * | 5/2005 | Kawai et al. ................. 358/1.18 |
| 6,909,520 B2 * | 6/2005 | Ogino .......................... 358/1.13 |
| 7,719,700 B2 * | 5/2010 | Farrell et al. ................. 358/1.13 |
| 2003/0179399 A1 | 9/2003 | Matsunoshita .............. 358/1.13 |

FOREIGN PATENT DOCUMENTS

| JP | 2003-280469 A | 10/2003 |
| JP | 2005-12623 A | 1/2005 |
| JP | 2006-295857 A | 10/2006 |

* cited by examiner

Primary Examiner — Scott A Rogers
(74) Attorney, Agent, or Firm — Fitzpatrick, Cella, Harper & Scinto

(57) ABSTRACT

The present invention provides an image outputting apparatus and a control method thereof, accommodated to a contradictory need of security improvement and TCO reduction in a rational manner. An embodiment of the present invention performs a setting of a black-and-white copy output by receiving an instruction from a user to output a black-and-white copy of a read document. Then, an LVBC extraction part and an LVBC color determining part determine whether the read document includes a color LVBC. An image-output controlling part outputs a color output of the read document when the read document has been determined to include color coded information, despite the setting of a black-and-white copy output.

9 Claims, 19 Drawing Sheets

IMAGE OUTPUTTING APPARATUS AND CONTROL METHOD THEREOF WITH OUTPUT OF COLOR COPY DESPITE SETTING FOR BLACK AND WHITE COPY

BACKGROUND OF THE INVENTION

1. Field of the Invention

The present invention relates to an image outputting apparatus and a control method thereof which read coded information embedded in a document and control image outputting based on the coded information.

2. Description of the Related Art

There are control techniques to encode a copy lock or copy restricting information of a document into a low-visibility code and to embed the code into the document and a technique to read the embedded information to control the copy lock or copy restriction. There are known image forming apparatuses having these security techniques (refer to Japanese Patent Laid-Open No. 2003-280469). Generally, managers of the image forming apparatuses have a need to improve security by using such a security technique to prevent spread of secret documents by copying, by restricting a part of the functions thereof, or the like.

Meanwhile, there is a view point of reducing TCO (cost reduction associated with drum durability, toner consumption, ink consumption, a charging counter, or the like). One method of reducing the TCO may be to suppress consumption of color toner or color ink. That is, there is a need to make users willingly to use black-and-white copying.

However, when the low-visibility code information is embedded in an image of a document, the low-visibility code information may be recorded with a particular color (e.g., yellow). Accordingly, in view of a priority for security, it is essential in copying to copy the low-visibility code information with the same color as in the document. That is, a security hole is caused by outputting in black-and-white the low-visibility code information to be recorded with the particular color such as yellow. From this reason, it is normally a standard to read and print a document in color mode to prevent the security hole to be caused, when coded information such as the low-visibility code information is printed for improving the security.

In this case, from a user's viewpoint, a desired function such as a black-and-white printing is restricted. That is, when a user desires to carry out the black-and-white copying, the user has to do an additional job to change setting. On the other hand, from a manager's viewpoint, there remains a problem that it becomes difficult to reduce the TCO.

SUMMARY OF THE INVENTION

The present invention provides an image outputting apparatus and a control method thereof which are accommodated to a contradictory need of the security improvement and the TCO reduction in a rational manner.

A first aspect of the present invention is an image outputting apparatus, comprising: a setting means for performing a setting of a black-and-white copy output by receiving an instruction from a user to output a black-and-white copy of a read document; a determining means for determining whether the read document includes color coded information; and an outputting means for outputting a color copy of the read document despite the setting of black-and-white copy output performed in the setting means, when the determining means has determined that the read document includes the color coded information.

A second aspect of the invention is an image outputting apparatus, comprising: a setting means for performing a setting of a black-and-white output by receiving an instruction from a user to output a black-and-white output of an input document; a determining means for determining whether the input document includes color coded information; and an outputting means for outputting a color output of the input document despite the setting of a black-and-white output performed in the setting means, when the determining means has determined that the input document includes the color coded information.

A third aspect of the invention is a control method of an image outputting apparatus, comprising the steps of: setting a black-and-white copy output by receiving an instruction from a user to output a black-and-white copy of a read document; determining whether the read document includes color coded information; and outputting a color copy of the read document despite the setting of a black-and-white copy output performed in the setting step, when the determining step has determined that the read document includes the color coded information.

According to the present invention, it is possible to accommodate the image outputting apparatus to a contradictory need of the security improvement and the TCO reduction as far as possible by extracting the embedded information together with color information thereof.

Further features of the present invention will become apparent from the following description of exemplary embodiments (with reference to the attached drawings).

DESCRIPTION OF THE EMBODIMENTS

Figure 1:
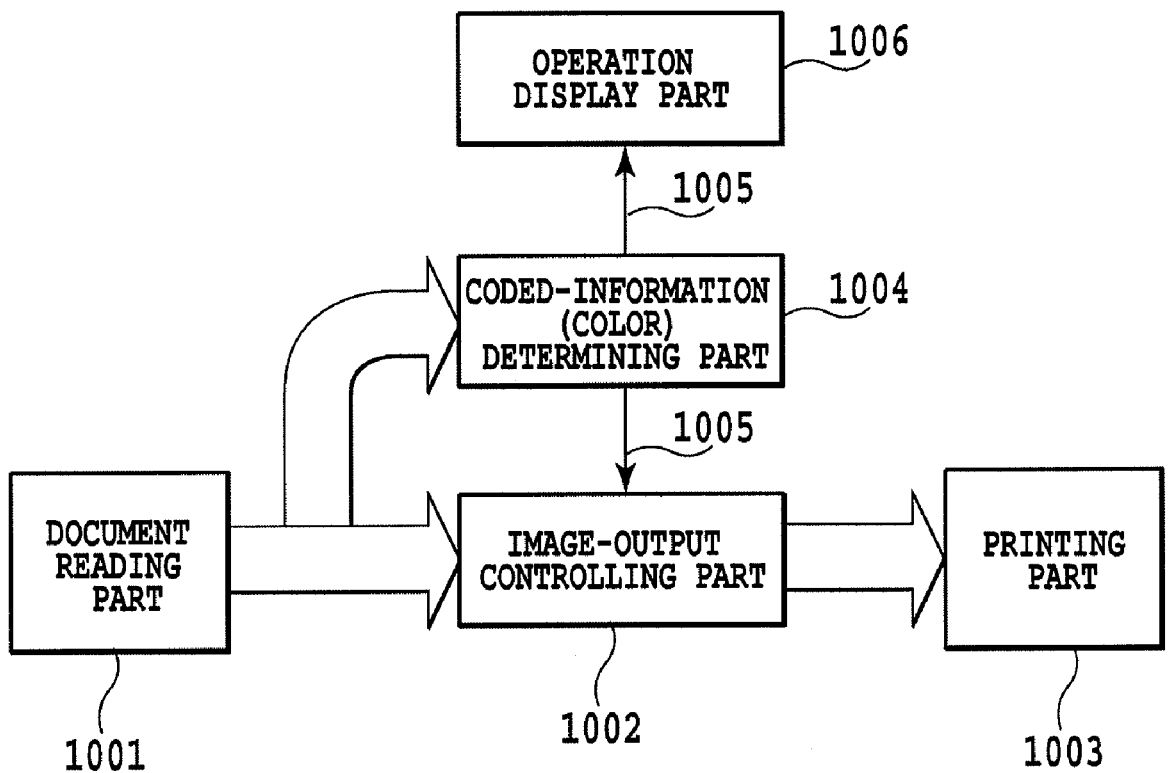
FIG. 1 is a diagram illustrating an example of an image-outputting control block of an image forming apparatus according to an embodiment of the present invention.

Hereinafter, an embodiment of the present invention will be described in detail with reference to the drawings. Note that, in the drawings explained hereinafter, components having the same function are denoted by the same reference numeral and repeated explanation thereof will be omitted.

First Embodiment

Image-Output Control Block Diagram

FIG. 1 is a diagram illustrating an example of a configuration of an image forming apparatus (image outputting apparatus) according to the present embodiment. In particular, FIG. 1 illustrates an example of a configuration including a coded-information extracting part as a coded-information extracting means and an output-image controlling part controlled according to a determination result in an image forming apparatus of the present invention.

Figure 15:
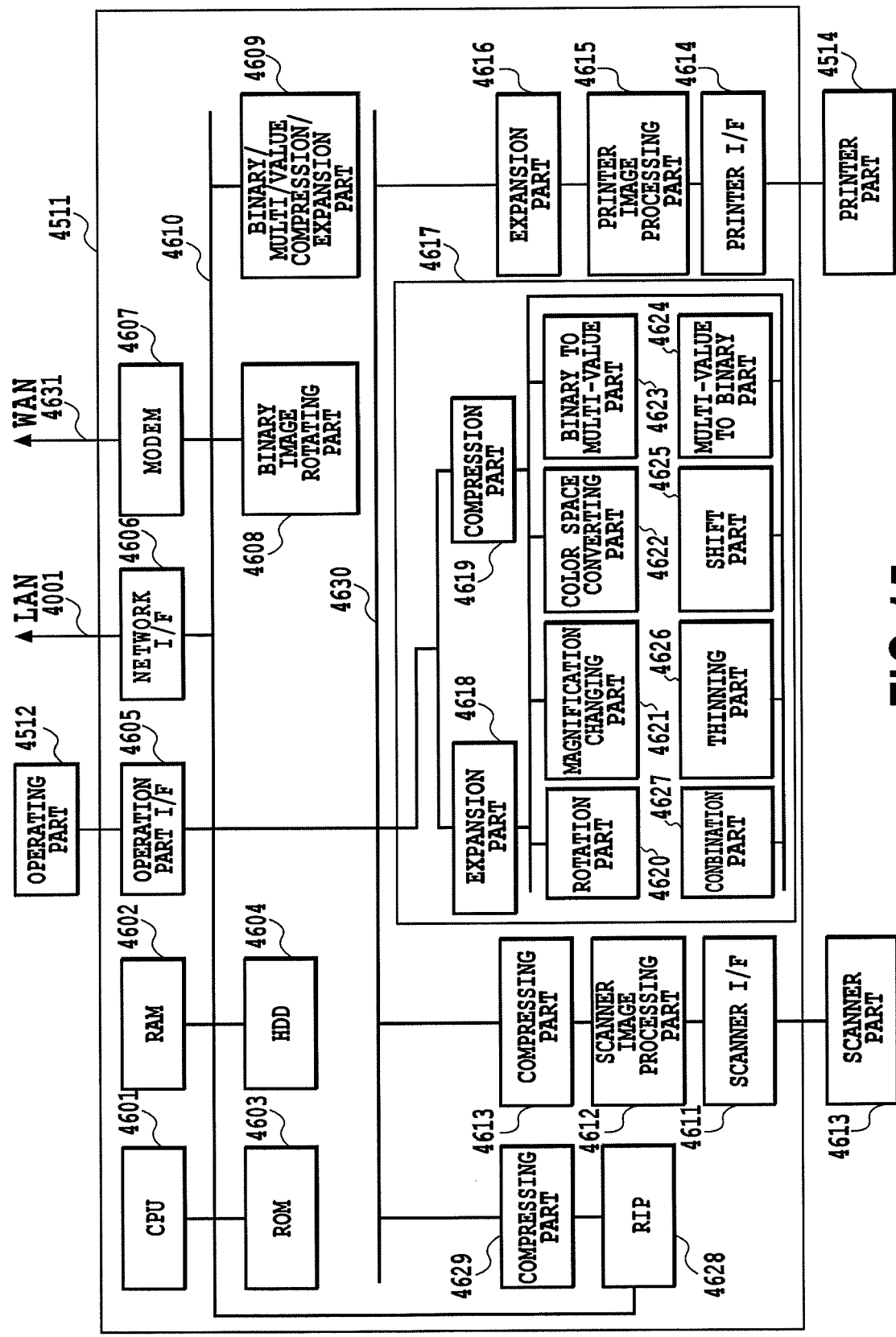
FIG. 15 is a block diagram illustrating an example of a controller in an image forming apparatus according to an embodiment of the present invention.

A document reading part 1001 can be a scanner part 4513 shown in FIG. 15. A coded-information (color) determining part 1004 extracts coded information based on an information embedding technique and determines a color of coded information color, on the basis of luminance in each RGB color inputted from the document reading part 1001. That is, the coded-information (color) determining part 1004 extracts color of the coded information (color information) together with the coded information included in a read document. The coded-information determining part 1004 outputs a determination result 1005 including the coded information and the extracted color information to an image-output controlling part 1002 and an operation display part 1006.

The image-output controlling part 1002 performs image output control of an output to printing part 1003 based on the determination result 1005. This printing part 1003 can be a printer part 4514 shown in FIG. 15. The operation display part 1006 performs changing of display contents or an operation setting method according to the determination result 1005 of the coded information (color) determining part 1004. This operation display part 1006 can be an operation part 4512 shown in FIG. 15.

Also, the image forming apparatus according to the present embodiment is provided with a control part controlling the whole image forming apparatus. The control part includes a CPU performing the controlling, a ROM storing a control program for this CPU, and a RAM providing a work area for the CPU, and also the control part controls each component of the configuration shown in FIG. 1 in an integrated manner.

It is a characteristic aspect of the image forming apparatus according to the present invention that the image-output controlling part 1002 performs the image output control according to the determination result of the coded-information (color) determining part 1004 in this manner. It is also another characteristic aspect thereof that the operation display part 1006 performs the changing of the display contents or the operation setting method according to the above determination result.

Note that the above mentioned coded information is information generated by encoding of source information and includes a digital watermark, one-dimensional barcode, two dimensional barcode, low-visibility barcode (LVBC), etc. In the present embodiment, an example will be explained using LVBC coded information for the coded information.

<LVBC>

Next, the LVBC will be described for a preferable example of an information embedding technique in the present embodiment.

Here, the information embedding means is a means for adding a desired information to print as system other than an image originally to be printed on an image forming medium (hereinafter called sheet) such as a paper sheet or OHP sheet in a printing apparatus.

Requirements for a general means of information embedding include the followings.

(1) Data of sufficient amount of information necessary for information embedding can be embedded in a sheet.

(2) Information embedded in a sheet with use of color material (toner, ink, or the like) can be extracted afterward as digital information without fail.

(3) A certain extent of durability can be obtained against factors in a document disturbing the information extraction such as, rotation, expansion, shrink, partial delete, signal blunting by copying, dirt, or the like, in copying a document image to a sheet.

(4) A real time capability of the extraction within a copying process or a similar high speed capability can be provided for preventing a copy-prohibited document from being copied.

The LVBC of the present embodiment satisfies the above requirements.

Figure 8:
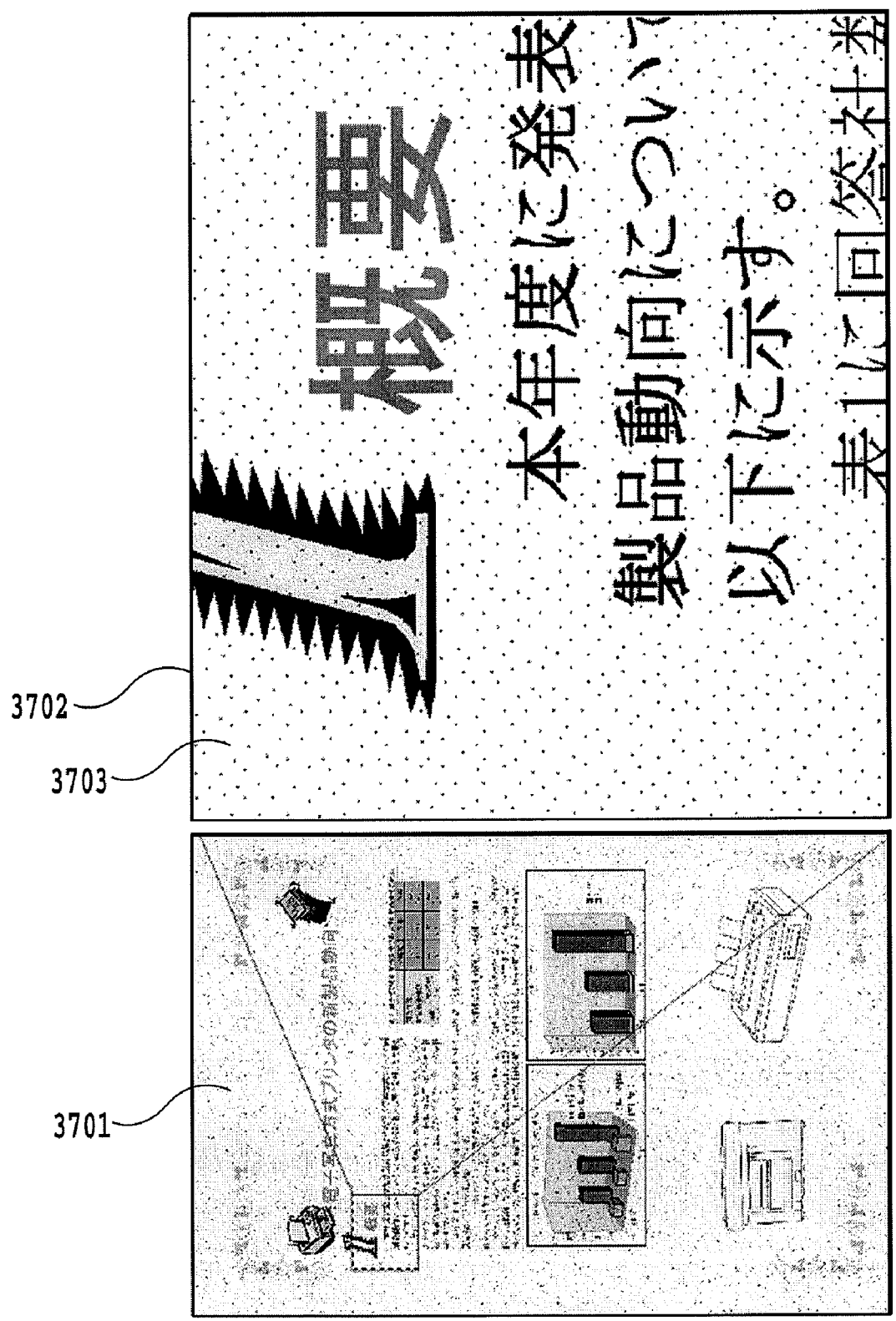
FIG. 8 is an image diagram illustrating an example of a document with an embedded LVBC according to an embodiment of the present invention.

FIG. 8 is an image diagram illustrating an example of a document with an embedded LVBC.

Reference numeral 3701 indicates the whole sheet and Reference numeral 3702 indicates an enlarged diagram of a part of the whole image 3701. The enlarged diagram 3702 shows a number of dots 3703 embedded apparently at random other than an image originally drawn in the document. Information to be added is embedded into these dots 3703.

<LVBC Embedding Method>

Next, an LVBC embedding method will be described.

For the LVBC, a dot pattern called a grid is printed other than an image to be printed in a sheet for embedding coded information (added information). In FIG. 8, the dots 3703 show dots composing the grid. The grid itself is a group of dots separated from each other with the same vertical and horizontal spacing. When a hypothetical line (guide line) connects dots of the grid in the shortest distance thereof, a hypothetical grid pattern appears to have vertical and horizontal lines with a uniform spacing.

The added information is inputted as binary data within a certain size. Displacing (shift from a center) the dots composing the grid upward, downward, leftward, and rightward in eight directions realizes information embedding of the added information.

Figure 9:
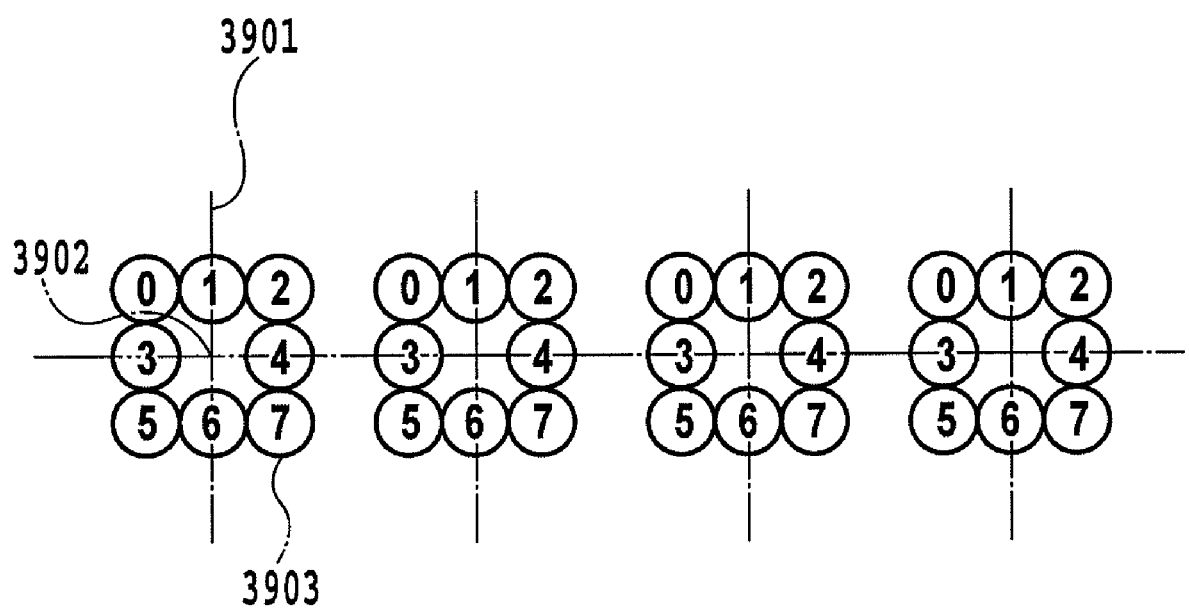
FIG. 9 is a diagram illustrating an example of embedding predetermined binary data as added information according to an embodiment of the present invention.

FIG. 9 illustrates an example of embedding binary data of 010111110011b as the added information. In FIG. 9, vertical and horizontal lines 3901 show hypothetical guide lines indicating a grid point. In this manner, a grid pattern appears when the grid points are connected in the shortest distance. Reference numeral 3902 indicates a center of the grid point where the dot is not located. Actually the dots are displaced and disposed at positions away from the center such as a position 3903, for example.

The data 010111110011b is divided by three bits into data sets of 010, 111, 110, and 011. Further, each of the three bit data sets is converted into decimal data sets of 2, 7, 6, and 3. As shown in a lower diagram of FIG. 9, by displacing the dots composing the grid upward, downward, leftward, and rightward into eight directions according to the values thereof, it is possible to represent the information. In this case, displacing the dots to upper right, lower right, lower and left positions can embed the information of 2, 7, 6, and 3, respectively. By repeating such processing, it is possible to embed the added information of around 2,000 bytes at most into a sheet using the LVBC. Further, it is possible to increase redundancy by repeatedly embedding the dots representing the added information into a sheet and thereby to improve reliability against false recognition as a document image, dirt on a sheet, and wrinkles and partial destruction of a sheet. Details will be described hereinafter in the analyzing method of LVBC.

Note that it is necessary to examine the position of a grid precisely for analyzing the LVBC and it is preferable to make the dots to appear in the eight directions with the same probability. For data to be embedded, however, there is a case in which a number of particular data values such as zero are desired to be embedded, and this case may not provide the same appearance probability as it is. Accordingly, the present embodiment provides a scramble processing (e.g., common key cryptographic processing) having reversibility of the information to be embedded and embeds the information by random dot displacements.

The LVBC embedding is a kind of DA conversion to record digital data of the added information on a sheet as analog data, and therefore can be realized by a relatively simple system.

<Analyzing Method of LVBC>

Next, an analyzing method of the LVBC will be described.

Figure 16:
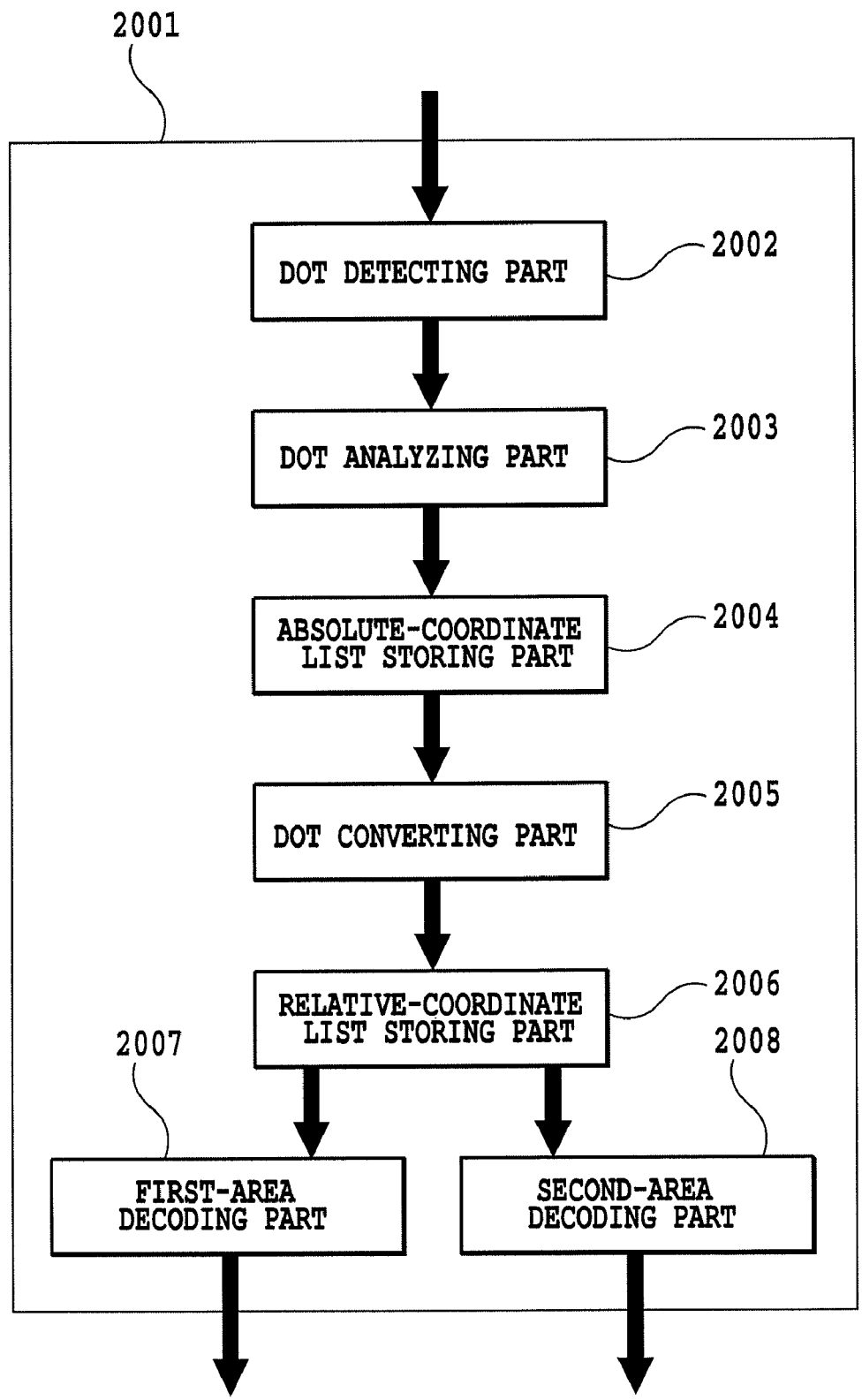
FIG. 16 is a block diagram of an embedded-information analyzing part analyzing an LVBC according to an embodiment of the present invention.

FIG. 16 is a block diagram of an embedded-information analyzing part 2001 performing analysis of the LVBC. In FIG. 16, Reference numeral 2002 indicates a dot detecting part extracting arbitrary dots from an image with embedded coded-information (added information) (where an original image and the added information are mixed) and outputting coordinates of the dots. Reference numeral 2003 indicates a dot analyzing part eliminating unnecessary dots such as dots making a halftone from the dots detected by the dot detecting part 2002. Reference numeral 2004 indicates an absolute-coordinate list storing part storing a list of absolute coordinates of the plurality of dots, which is an output result analyzed by the dot analyzing part 2003.

Reference numeral 2005 indicates a dot converting part detecting a rotation angle and a grid spacing from the absolute coordinate list stored in the absolute-coordinate list storing part 2004 and converting the absolute coordinates into relative coordinates from a gridpoint. Reference numeral 2006 indicates a relative-coordinate list storing part storing the relative coordinates of each of the plurality of dots from the grid point analyzed by the dot converting part 2005. Reference numeral 2007 indicates a first-area decoding part extracting a first area of the embedded added information and outputting the extraction result to the following stage. Reference numeral 2008 indicates a second-area decoding part extracting a second area of the embedded added information and outputting the extraction result to the following stage.

The above mentioned "following stage" means a functional module utilizing the added information, for example, a functional module discontinuing printing operation when copy-prohibiting information is extracted from the added information, or displaying sheet owner information on the operation display when tracking information is extracted.

Figure 19:
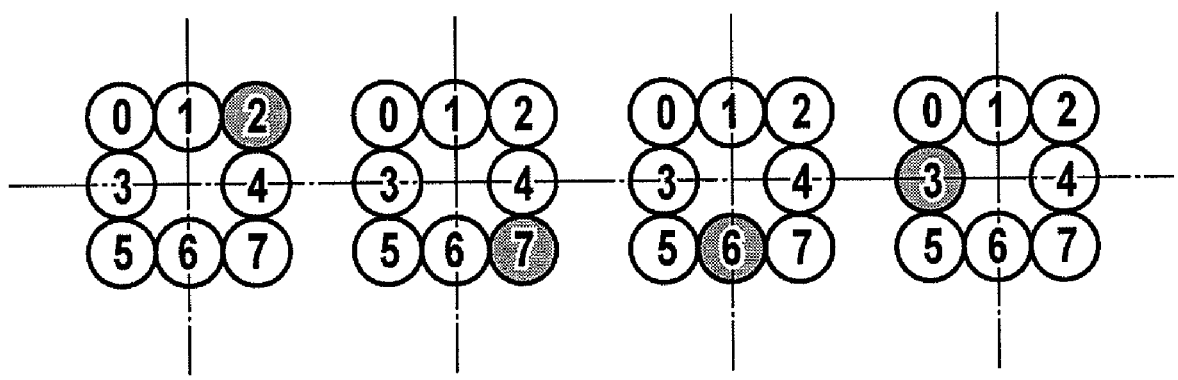
FIG. 19 is an explanatory diagram of a conversion of a grid displacement into actual data according to an embodiment of the present invention.

FIG. 19 is a diagram explaining conversion of the grid displacements into actual data. The displacements in vertical and horizontal directions from the grid point represent information of 0 to 7. In the case of FIG. 19, 2, 7, 6, and 3 are extracted and three bit binary data thereof is collected to reproduce 010111110011 as the embedded data extracted from these dots. By carrying out such extracting processing similarly for all the dots, it is possible to perform embedding of several tens to several thousands byte information.

<Kinds of Document Images>

Figure 2:
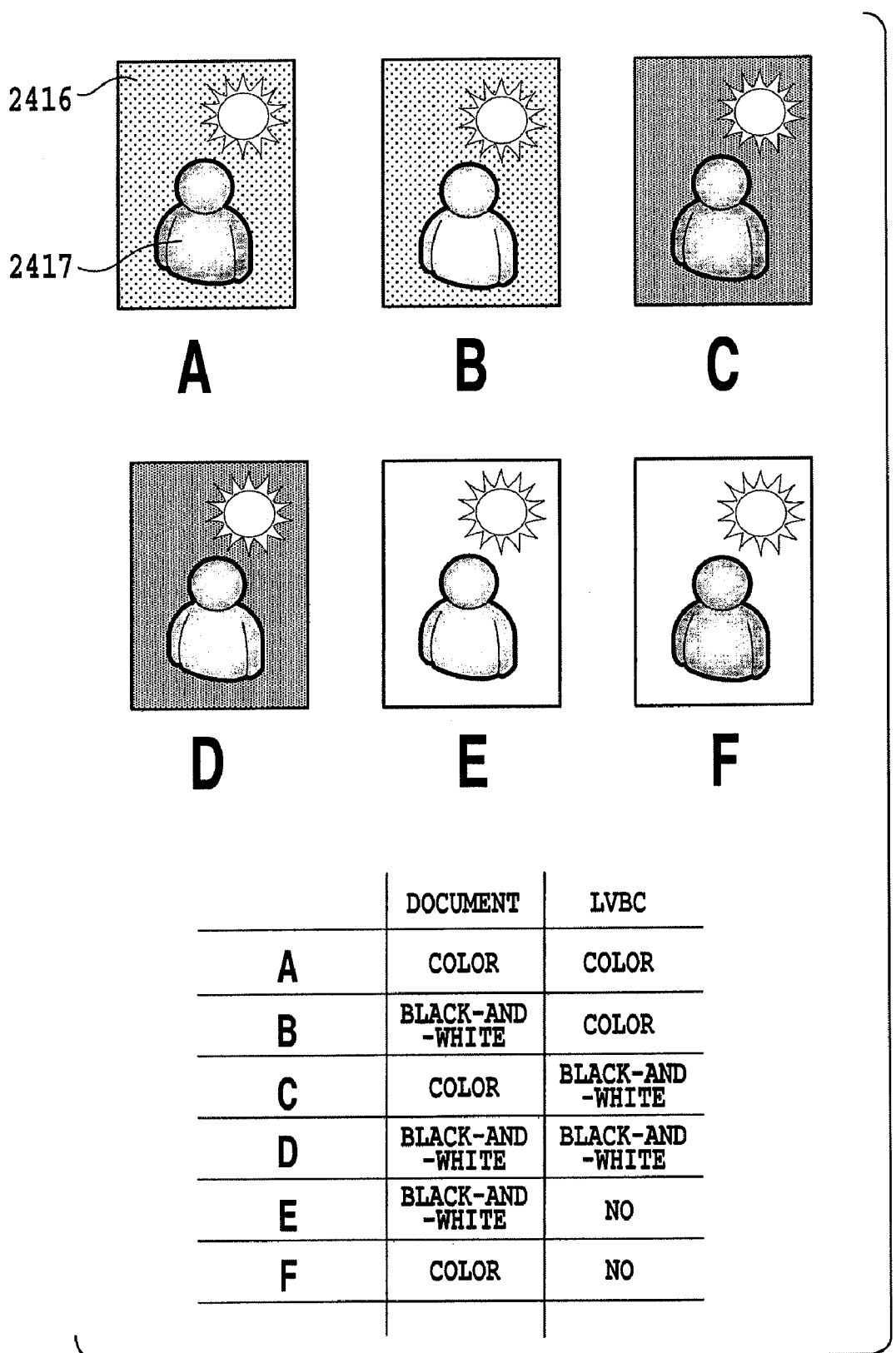
FIG. 2 is a diagram illustrating an example of kinds of documents treated in an image forming apparatus according to an embodiment of the present invention.

FIG. 2 is a diagram explaining kinds of documents treated in the image forming apparatus of the present invention. The image forming apparatus of the present embodiment treats six kinds of document depending on document colors 2417 of a read document, colors of the coded information (here, LVBC) embedded in a background thereof 2416, and whether the coded information exists or not therein.

For example, FIG. 2A shows a case of a color document and a color LVBC and FIG. 2B shows a case of a black-and-white document and a color LVBC. Here, the color document means that a document portion has a chromatic color and a black-and-white document means that a document potion has an achromatic color. Also, the color LVBC means that the LVBC of the coded information has a chromatic color and the black-and-white LVBC means that the LVBC has a black-and-white color.

A document with the embedded LVBC as shown in FIG. 2A, 2B, 2C, or 2D usually can be made by printing or copying, and the color of the LVBC can be indicated on a host PC side or in the image forming apparatus. In the printing, the document is made by data transmission of print data, and, in the copying, the embedding is performed by copying a document which does not have the embedded LVBC.

<Whole System Configuration>

Figure 3:
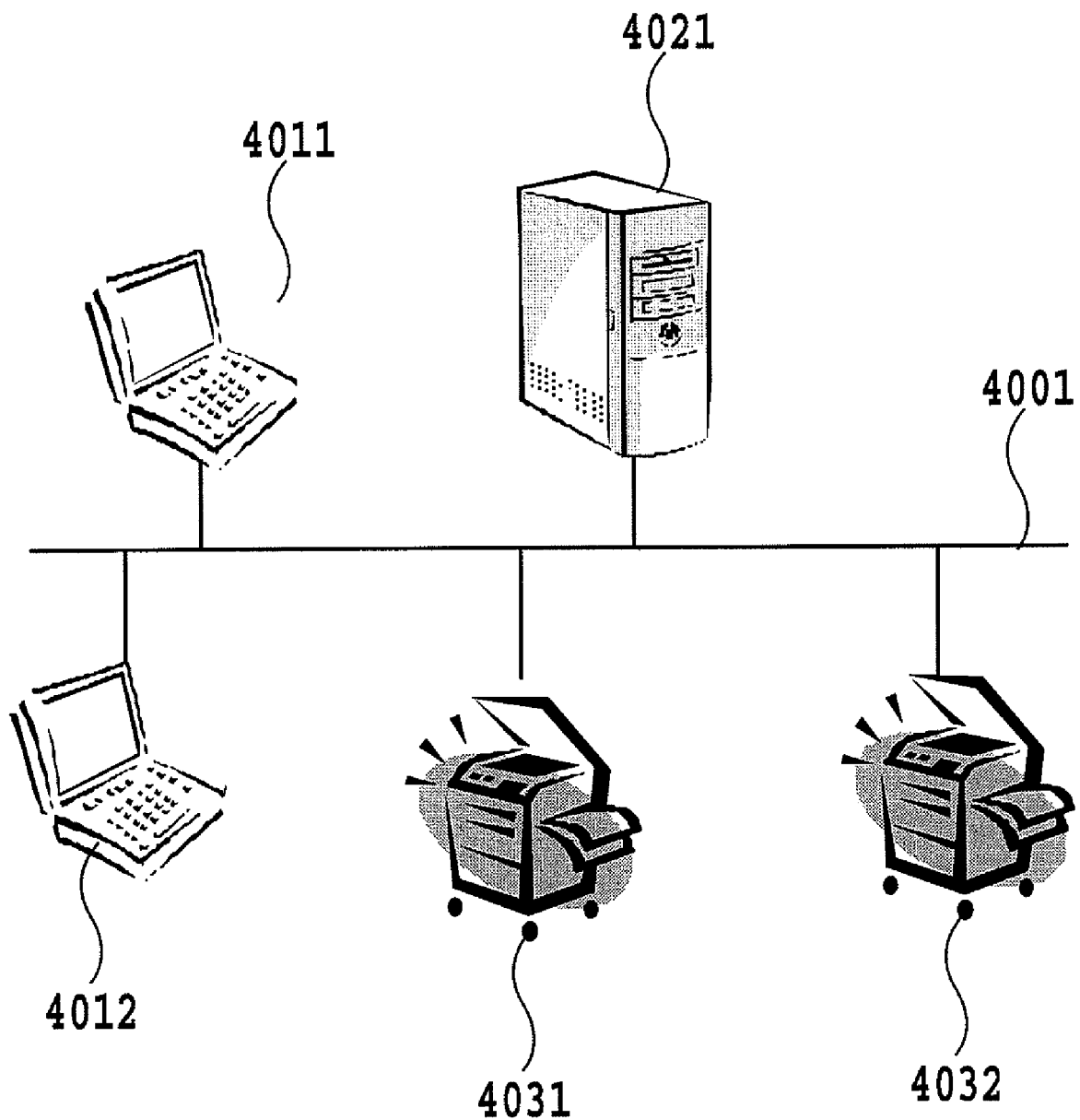
FIG. 3 is a diagram explaining the whole system configuration of an embodiment of the present invention.

FIG. 3 is a diagram explaining the whole system configuration of the present embodiment. In FIG. 3, Reference numerals 4011 and 4012 indicate client PCs, Reference numeral 4021 indicates a print server, and Reference numerals 4031 and 4032 indicate image forming apparatuses having functions of a copy machine and a printer. These apparatuses are connected with each other via a LAN 4001 and have a function to communicate with each other via the LAN 4001.

When a user operates the client PC 4011 or 4012, the client PC 4011 or 4012 generates print data and sends the data to the print server 4021. The print sever 4021 also sends the received print data to the image forming apparatus 4031 or 4032. The image forming apparatus 4031 or 4032 interprets the received print data, converts the data into an image, and prints the image on a paper to generate a printed matter.

Note that the above configuration is an example and a configuration without the print server 4021 can be obviously considered to be another example. In this case, the client PC 4011 or 4012 sends the print data directly to the image forming apparatus 4031 or 4032.

<Detailed Description of a Controller>

FIG. 15 is a block diagram explaining a configuration of a controller 4511 provided in the image forming apparatus 4031 or 4032 in more detail.

The controller 4511 is electrically connected to a scanner 4513 and a printer part 4514, and connected to a print server 4021 and external apparatuses via the LAN 4001 or a WAN 4031 on the other hand. Thereby, image data or device information can be input or output in the image forming apparatus.

A CPU 4601 controls accesses of various kinds of devices connected thereto in an integrated manner on a basis of a control program stored in a ROM 4603 and controls also various kinds of processing performed within the controller in an integrated manner. A RAM 4602 is a system work memory for the operation of the CPU 4601 and also a memory storing temporarily image data. This RAM 4602 may be constituted by an SRAM retaining stored contents after a power is turned off and a DRAM in which stored contents are erased after a power is turned off. The ROM 4603 stores a boot program and the like of the apparatus. In the present embodiment, the CPU 4601 executes processing operation such as various computations, controls, determinations, and the like according to control programs stored in the ROM 4603 for the processing according to the present embodiment and the like. An HDD 4604 is a hard disk drive capable of storing system software or image data.

An operation part I/F 4605 is an interface part for connecting a system bus 4610 and the operation part 4512. This operation part I/F 4605 receives image data to be displayed on the operation part 4512 from the system bus 4610 and outputs the image data to the operation part 4512 and also outputs information input from the operation part 4512 to the system bus 4610.

A network I/F 4606 is connected to the LAN 4001 and the system bus 4610 and performs information inputting and outputting. A modem 4607 is connected to the WAN 4631 and the system bus 4610 and performs information inputting and outputting. A binary-image rotating part 4608 converts a direction of image data before transmission. A binary-image compression and expansion part 4609 converts a resolution of image data before transmission into a predetermined resolution or a resolution compatible to a capability of a counterpart. Note that a method used in the compression and expansion may be JBIG, MMR, MR, MH, or the like. An image bus 4630 is a transmission line for transmitting image data and is configured according to a PCI bus or the IEEE 1394 standard.

A scanner-image processing part 4612 performs correction, modification, and edition for image data received from the scanner part 4513 via a scanner I/F 4611. Here, the scanner-image processing part 4612 determines to which corresponds the received image data among a color document, a black-and-white document, a character document, a photographic document and the like, and a result thereof is attached to the image data. Such attached information is called attribute data. Details of the processing performed in this scanner-image processing part 4612 will be described hereinafter.

A compression part 4613 receives the image data and divides this image data into blocks of 32 pixels×32 pixels. Here, the image data of 32 pixels×32 pixels is called tile data. On a document (paper medium to be read), an area corresponding this tile data is called a tile image. The tile data is provided with attached header information of average luminance information in the block of 32 pixels×32 pixels and coordinates of the tile image on the document. Further, the compression part 4613 compresses an image composed of multiple sets of the tiled data and an expansion part 4616 expands the image data composed of multiple sets of the tile data, and then provides raster development to the expanded image data and send the raster data to a printer-image processing part 4615.

The printer-image processing part 4615 receives the image data sent from the expanding part 4616 and provides image processing to the image data referring to the attribute data attached to the image data. The image data after the image processing is output to the printer part 4514 via a printer I/F 4614. Detailed processing performed in this printer-image processing part 4615 will be described hereinafter.

An image converting part 4617 provides a predetermined converting processing to the image data. This processing part includes various processing parts as described below.

An expansion part 4618 expands received image data. A compression part 4619 compresses received image data. A rotation part 4620 rotates received image data. A magnification changing part 4621 provides received data with resolution converting processing (e.g., from 600 dpi to 200 dpi) A color-space converting part 4622 converts a color space of received data. With use of a matrix or a table, this color space converting part 4622 can perform a well-known background color removal processing, a well-known LOG conversion processing (RGB to CMY), and further performs monochrome conversion (RGB to K (R=G=B)) and a well-known output color correction processing (CMY to CMYK). A binary to multi-value conversion part 4623 converts received binary tone image data into 256 tone image data. A multi-value to binary conversion part 4624 adversely converts received 256 tone image data into binary tone image data using a method such as an error diffusion processing.

A combination part 4627 combines two sets of received image data to generate one set of image data. Here, for combining two sets of image data, there is a method in which an average value of luminance levels of pixels to be combined is assumed to be a combined luminance value, or a method in which a greater luminance value for pixels to be combined is assumed to be a luminance level of a combined pixel. Moreover, it is possible to use a method in which a smaller luminance value for pixels to be combined is assumed to be a luminance level after combination, or a luminance level employed after combination can be decided through a logical sum calculation, a logical product calculation or an exclusive OR calculation of luminance values in pixels to be combined. These are all well known combining methods. A thinning part 4626 performs a resolution conversion by thinning out pixels of received image data to generate image data, a resolution of which is ½, ¼, ⅛, or the like of the received image data.

A shift part 4625 adds a margin portion to received data, or deletes a margin portion from received image data. An RIP 4628 receives intermediate data, which is generated on the basis of PDL code data transmitted from the print server 4021 or the like, and generates (multi-valued) bit map data.

The scanner part 4513 is configured to read an image formed on a recording medium. The scanner part 4513 exposes and scans an image on a document and inputs the obtained reflected light to CCDs, and thereby converts image information into an electric signal. The scanner part 4513 further converts the electric signal into a luminance signal for each R, G, and B color and outputs this luminance signal as image data to the controller 4511.

The printer part 4514 prints the received data from the controller 4511 on a recording medium, that is, the printer part 4514 is an image forming device forming an image. A method for this image formation may be any of an electrophotographic method, an ink-jet method, etc.

<Detailed Description of the Printer-Image Processing Part 4615>

Figure 17:
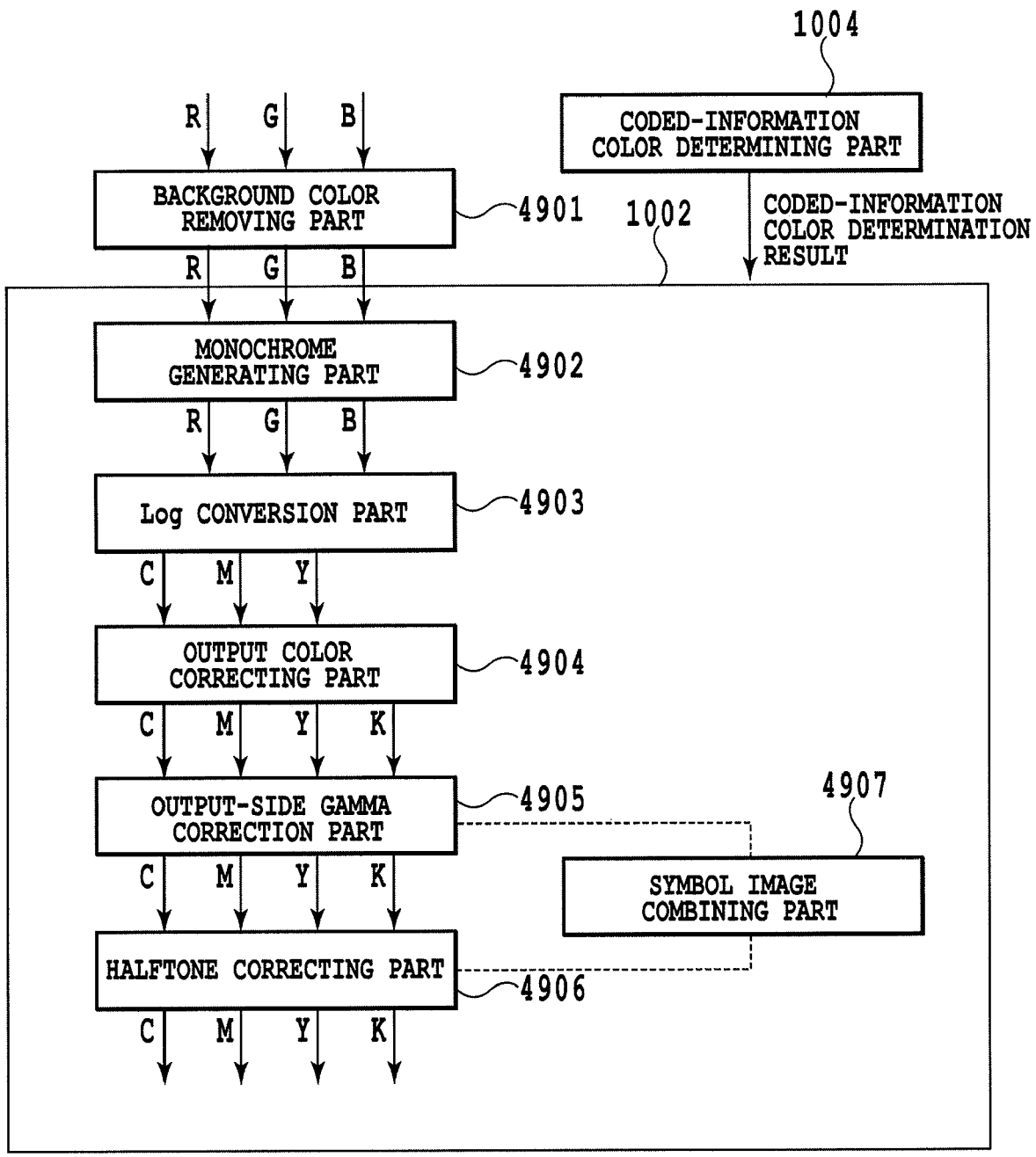
FIG. 17 is a diagram illustrating an example of a printer-image processing part in an image forming apparatus according to an embodiment of the present invention.

FIG. 17 illustrates a flow of the processing performed in the printer-image processing part 4615.

A background color removing part 4901 removes background color of image data using a histogram generated in the scanner-image processing part 4612. A monochrome generating part 4902 converts color data into monochrome data. A Log conversion part 4903 performs luminance-intensity conversion. This Log conversion part 4903 converts RGB input image data into CMY image data, for example.

An output-color correcting part 4904 performs output color correction. For example, the output-color correcting part 4904 converts CMY input image data into CMYK image data by using a table or a matrix. An output-side gamma correction part 4905 corrects a signal value input into this output-side gamma correction part 4905 to be proportional to a reflection intensity value of a copy output. A symbol-image combining part 4907 combines background image data generated by a meta-information image generating part described hereinafter and (document) image data. A halftone correction part 4906 performs halftone processing according to the number of gradients in the printer part for output. For example, the halftone processing part 4906 converts received image data having a large number of gradient values into image data having gradient values of 2 or 32.

Here, each processing part of the scanner-image processing part 4612 and the printer-image processing part 4615 can output received image data without providing any processing. Such an event that a certain processing part passes through data without providing processing thereof will be described as "pass through the processing part" hereinafter.

<Instruction of Information Embedding for Copy Prohibition or Print-Output Tracking, and Copy Prohibiting Operation>

First, there will be simply described operation of the present system associated with copy prohibiting operation.

In the configuration shown in FIG. 3, a user instructs to embed information for copy prohibition or print-output tracking into a print output when operating the client PC 4011 or 4012. When having received this instruction, the image forming apparatus 4031 or 4032 embeds an image including information (coded information) for copy prohibition or print-output tracking into a background image of a print output to be generated. An example of the print output including the background image is shown in FIG. 8, where the LVBC includes copy prohibition information.

When a user tries to copy a document including copy prohibition information as shown in FIG. 8 using the image forming apparatus 4031 or 4032, the image forming apparatus 4031 or 4032 detects that the document includes copy prohibition information and discontinues copy operation. Thereby, an important document is prevented from being copied.

<Setting for Copy Prohibition Information or Tracking Information in the Client PC>

Figure 4:
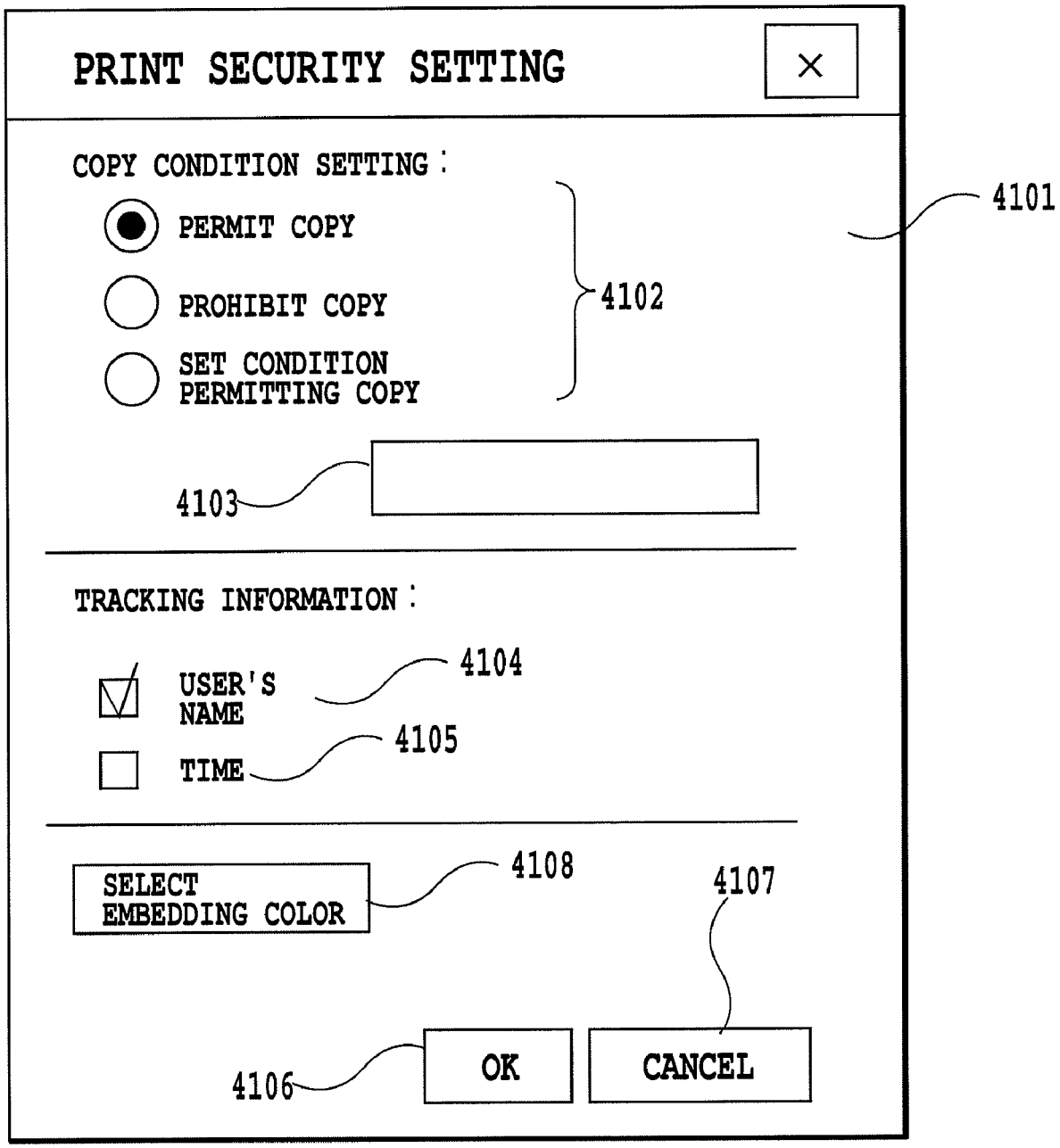
FIG. 4 is a diagram illustrating an example of a setting screen in a printer driver according to an embodiment of the present invention.

FIG. 4 illustrates one of setting screens for the printer driver in the client PC 4011 or 4012.

In FIG. 4, Reference numeral 4101 indicates a dialog box for print security setting, and a user performs setting operation for setting security to be embedded in a print output by operating this dialog box. The print-security setting dialog box 4101 is broadly divided into two parts, and an upper half thereof is for setting copy prohibition and a lower half thereof is for setting tracking information and embedding color.

In the upper half part for setting copy prohibition, a user selects one among three settings: "permit copy", "always prohibit copy", and "release copy prohibition by a password input", by operating radio buttons 4102 in the present embodiment. When the third setting "release copy prohibition by a password input", is selected, a password input field 4103 becomes ready for input and a user can input a password to release the copy prohibition.

In the lower half part of the print security setting dialog box 4101 for setting tracking information, two check boxes 4104 and 4105 are prepared in the present embodiment. A user can instruct to embed each of user's name and time information by checking the check boxes.

<Embedding-Color Setting Screen>

Figure 5:
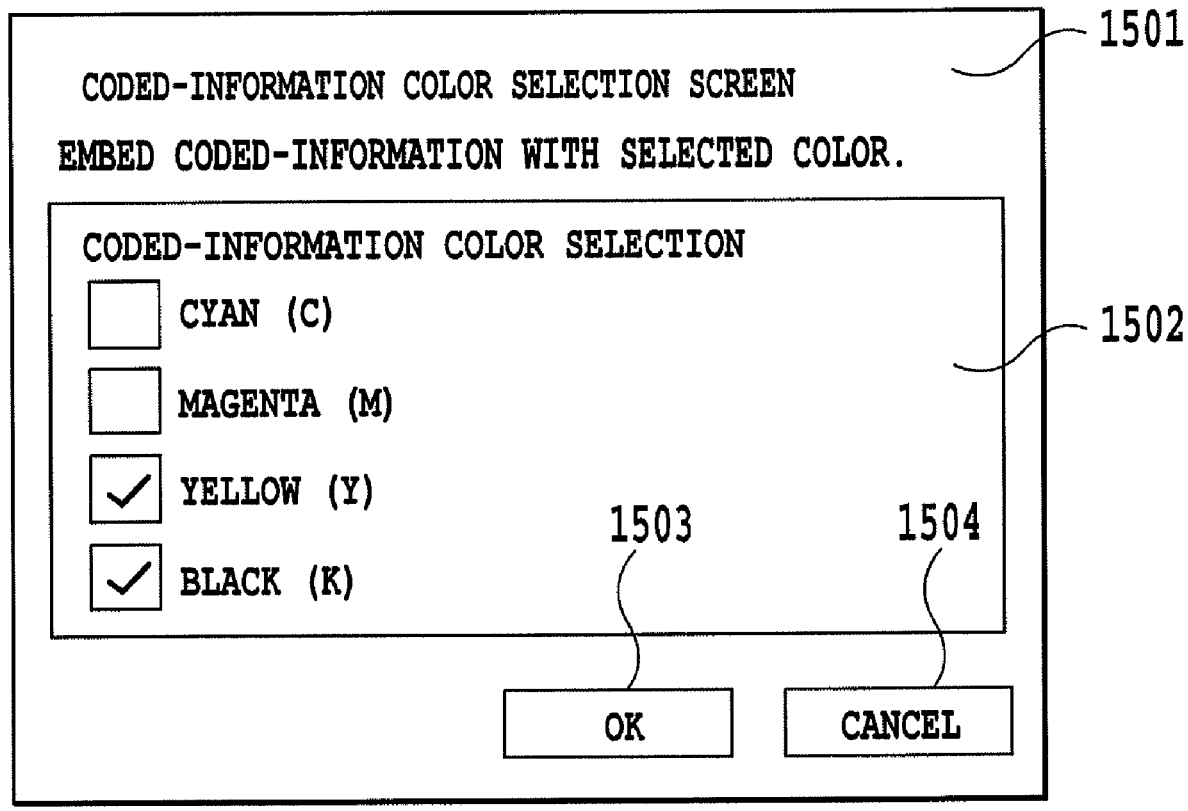
FIG. 5 is a diagram illustrating an example of a display of an embedding-color setting screen in an image forming apparatus according to an embodiment of the present invention.

FIG. 5 illustrates an example of an embedding-color setting screen in the image forming apparatus according to the present embodiment. The screen jumps to the embedding-color setting screen by a button 4108 in the present embodiment. That is, when a user pushes the button 4108, a screen shown in FIG. 5 appears on the display of the client PC 4011 or 4012. In the embedding color setting, the user can set an embedding color by checking a check box 1505 prepared preliminarily for each color to be set. The added information is embedded into a sheet in a color according to the color selected in this screen.

<Copy Prohibiting Operation in the Image Forming Apparatus>

There will be described an example of a screen displayed when the image forming apparatus 4031 or 4032 has detected the copy prohibition information included in a document.

Figure 6:
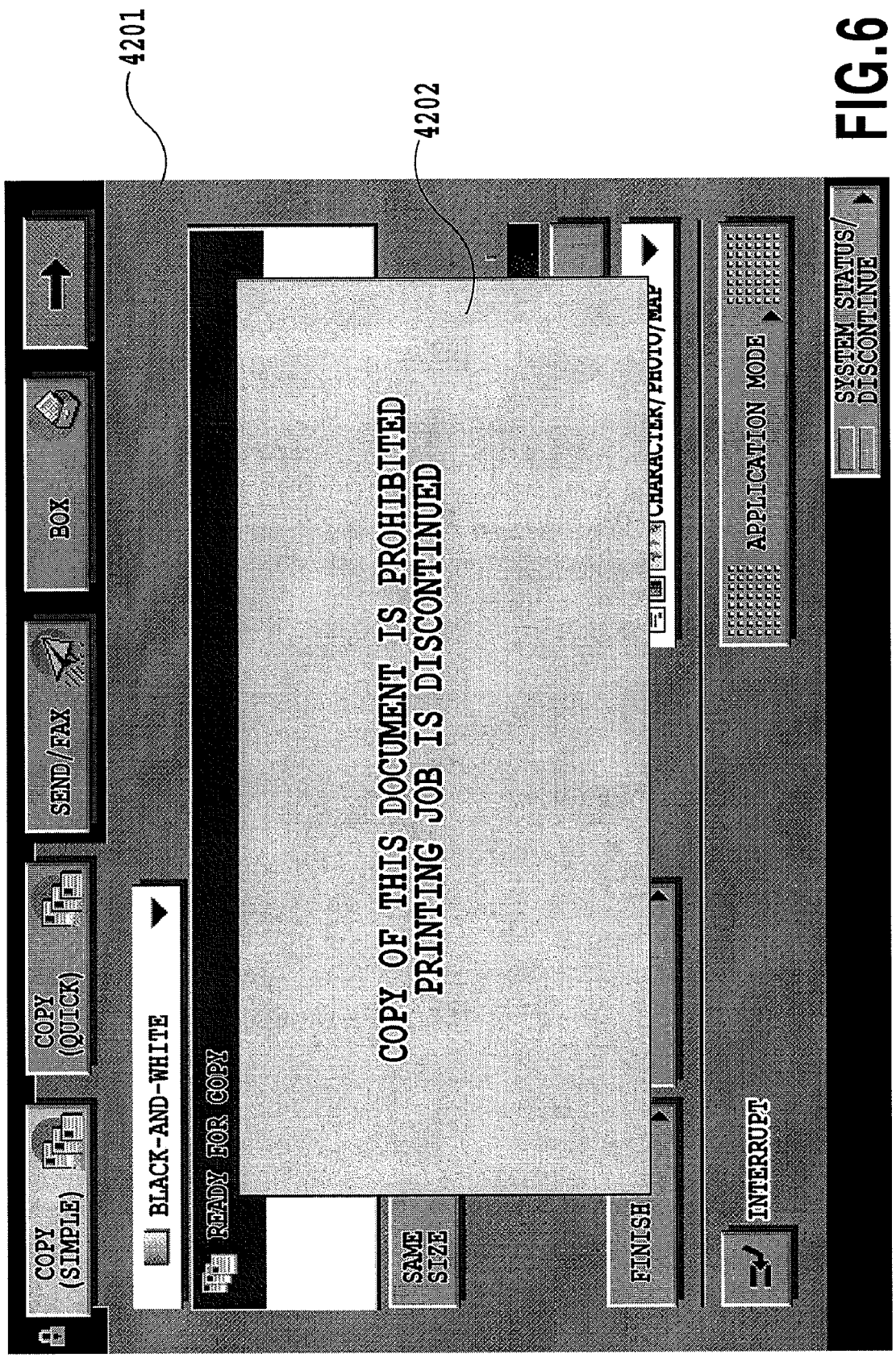
FIG. 6 is a diagram illustrating an example of a screen display notifying copy prohibition in an image forming apparatus according to an embodiment of the present invention.

FIG. 6 illustrates a case in which a user tries to copy a document with the embedded copy prohibition information "always prohibit copy" among the three copy prohibition settings explained in FIG. 4. FIG. 6 is an example of a screen showing a screen display when the image forming apparatus has detected the copy prohibition information included in the document and discontinued copy operation in this case. In FIG. 6, Reference numeral 4201 is an operation screen, on which a message of discontinuing copy operation is displayed by a message dialog box 4202.

Figure 7:
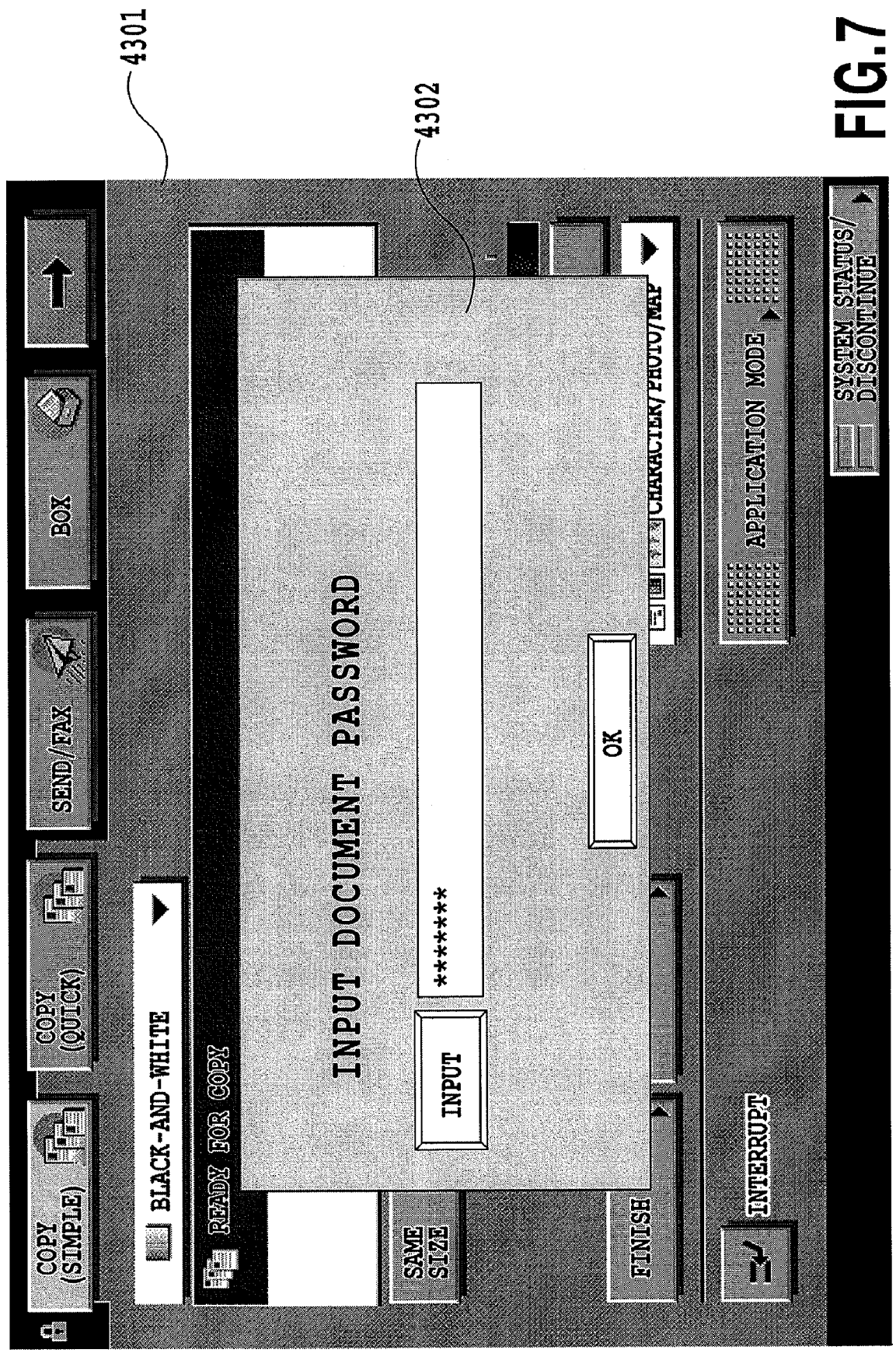
FIG. 7 is a diagram illustrating an example of a screen display notifying pass-word input in an image forming apparatus according to an embodiment of the present invention.

FIG. 7 illustrates a case in which a user tries to copy a document with the embedded copy prohibition information "release copy prohibition by a password input" among the three copy prohibition settings explained in FIG. 4 in the image forming apparatus. FIG. 7 is an example of a screen showing a screen display of this case when the image forming apparatus has detected the copy prohibition information included in the document and discontinued copy operation.

In FIG. 7, Reference numeral 4301 is the operation screen, on which is displayed a dialog box 4302 prompting the user to input a password. The user inputs a password by using a soft keyboard, or an IC card not shown, or the like. The image forming apparatus determines whether a password included in a background image of the document is the same as the password input. If the both password are determined to be the same as a result of the determination, the image forming apparatus closes the dialog box 4302 and continues the copy operation. On the other hand, if the password input fails, the copy operation is discontinued.

<Explanation of an Operation-Part Screen Display [1]>

Figure 10:
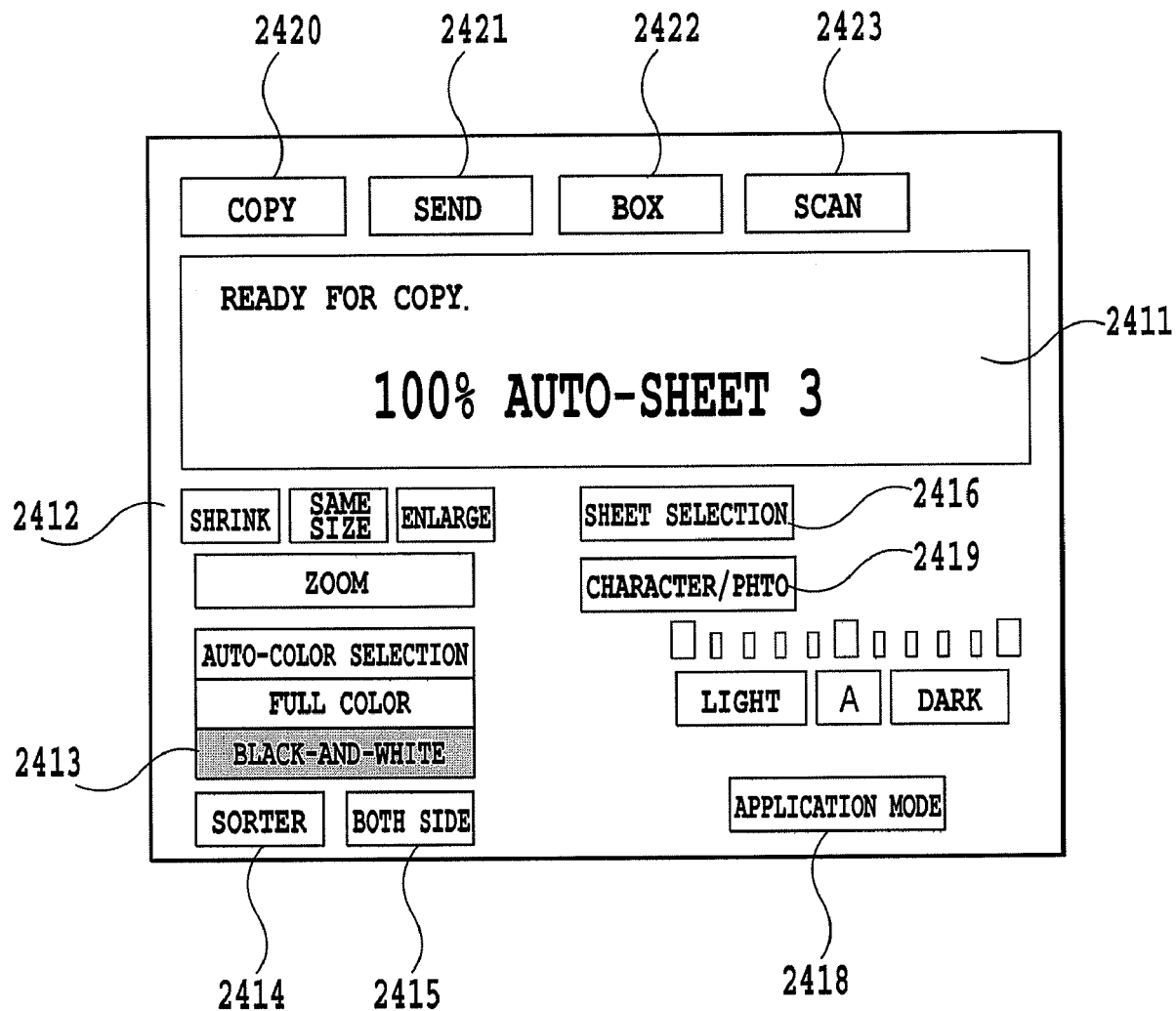
FIG. 10 is a diagram illustrating an example of a screen display in an image forming apparatus according to an embodiment of the present invention.

FIG. 10 illustrates an example of an operation-part screen display of the image forming apparatus according to the present embodiment. A screen in FIG. 10 illustrates an example of a liquid crystal panel display in a copy operation mode. Operation mode selection keys arranged on the screen are "COPY" 2420, "SEND" 2421, "BOX" 2422, and "SCAN" 2423. Each of these operation modes is switched by push-down of the key for selection. A setting display part 2411 is a part displaying a current operation status of the digital composite machine, a set magnification, a kind of print paper, and the number of copies. A magnification soft key group 2412 includes soft keys of "same size", "enlarge", "shrink", and "zoom" relating with magnification in copying. The "same size" key is pushed to obtain a copy magnification of 100%. The "shrink" or "enlarge" key is pushed for shrinking or enlarging a copy into a predetermined size. The "zoom" key is pushed for shrinking or enlarging a copy size by 1%.

A color mode selection key 2413 is pushed for selecting an output color in printing. In an example of FIG. 10, black-and-white copy-output setting is selected. When a user selects the black-and-white output mode by the color mode selection key 2413 in this manner, the image-output controlling part 1002 performs the black-and-white copy-output setting according to the user's instruction to output a black-and-white copy of a read document.

A "sorter" key 2414 is used for indicating a processing method of an output sheet. A "both-side" key 2415 is used for a document or an output method associated with both-side printing. A "sheet selection" key 2416 is used for a jump to a screen for setting size, color, material, etc. of an output sheet. In the image forming apparatus according to the present embodiment, sheet feeding control is performed according to a kind of sheet selected in this sheet selecting screen. An intensity setting key group 2417 is a part adjusting intensity in document reading or image outputting and displaying the set contents thereof. An "application mode" key 2418 is used for a jump to an application mode screen.

<Explanation of the Operation-Part Screen Display [2]>

Figure 11:
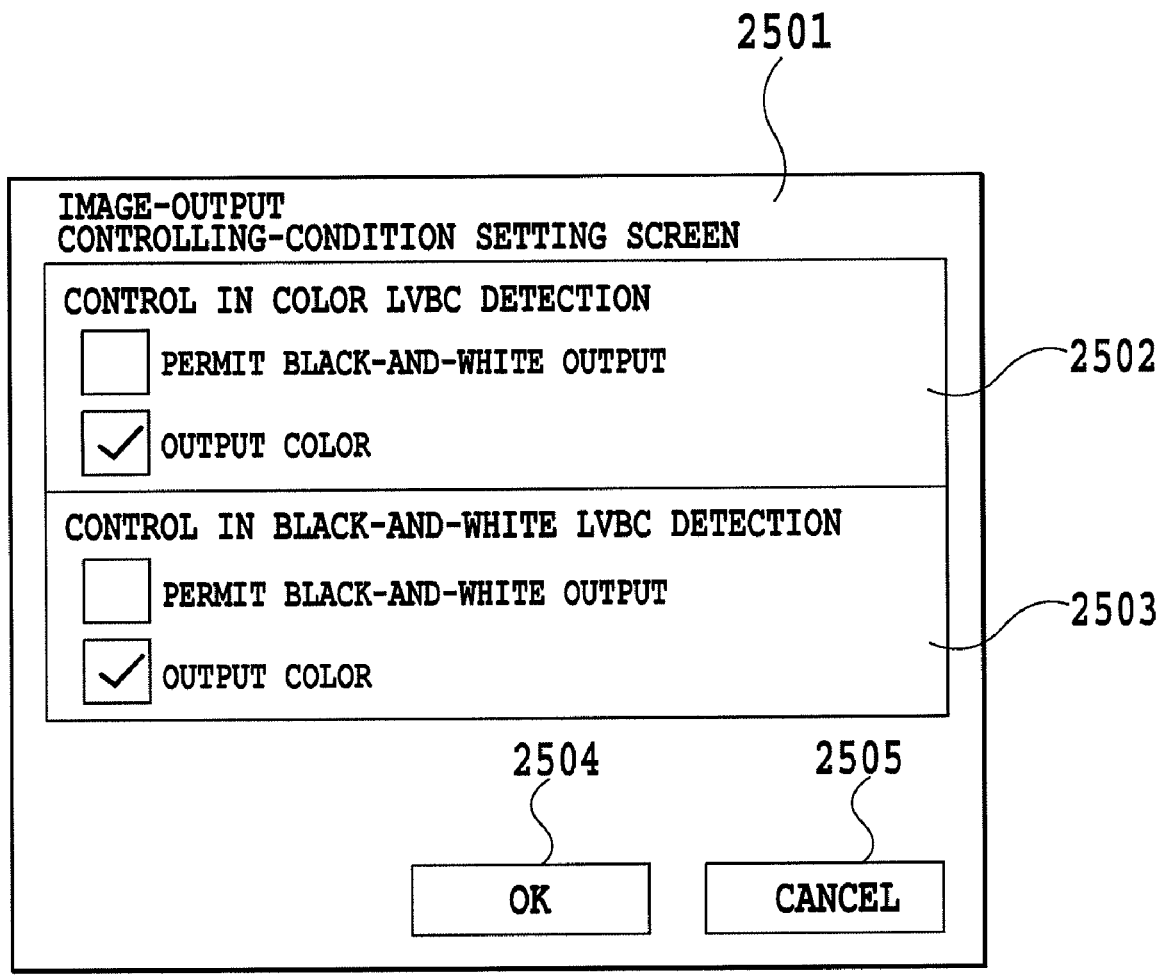
FIG. 11 is a diagram illustrating an example of a screen display in an image forming apparatus according to an embodiment of the present invention.

FIG. 11 illustrates an example of an image-output control-condition setting screen. This screen example shows a screen for selecting allowing a black-and-white copy to be outputted or outputting a color copy, when the image forming apparatus has read a document, determined a LVBC color, and detected a color LVBC or a black-and-white LVBC as a result of the determination. The selection can be made by checking a check box prepared for each option. The image-output control-condition setting screen 2501 shown in FIG. 11 includes a control selection box 2502 for color LVBC detection and a control selection box 2503 for black-and-white LVBC detection. Each of the control selection boxes includes check boxes for a user to select one out of the prepared options.

Here, in the present embodiment, the image-output control-condition setting screen 2501 is displayed by user's selection in a dialog box which is displayed by user's push-down of the application mode key 2418 in the screen shown in FIG. 10. However, the above sequence to display the image-output control-condition setting screen 2501 is only an example, and the image-output control-condition setting screen 2501 can be displayed by a push-down of another key or by another desired sequence.

The image forming apparatus displays the image-output control-condition setting screen 2501 on the operation display part 1006 by receiving a user's instruction, for example, push-down of the application mode key 2418. Then, the image-output controlling part 1002 decides output color for a color LVBC of the coded information or decides output color for a black-and-white LVBC of the coded information, according to the user's input in the screen 2501. In FIG. 11, since a check box "output color" is checked in the control selection box 2502, the image-output controlling part 1002 performs a control to print in color when having detected a color LVBC. Also in FIG. 11, since a check box "permit black-and-white output" is checked in the control selection box 2503, the image-output controlling part 1002 performs to print in black-and-white when having detected a black-and-white LVBC.

By preliminarily setting the output color according to user's desire regarding the determining result of the coded information color in this manner, it is possible to output (copy or print) the desired color automatically without change of the user's setting for each case and to improve convenience for the users.

Particularly in the image forming apparatus normally set to output black-and-white for reducing the TCO, the present embodiment is effective for improving security of the coded information. In this case, a user selects the black-and-white output mode by the color mode selection key 2413. According to this selection, the image-output controlling part 1002 performs the black-and-white output setting. At this time, if a user checks the check box of "output color" in the control selection box 2502, the image output controlling part 1002 performs a control to output a color copy of the read document despite the setting of black-and-white copy output. Accordingly, while normal printing outputs a black-and-white copy in this case, a color copy is output when color coded information is detected, and thereby it is possible to restrain a generation of a security hole.

<Explanation of the Operation Part Screen Display [3]>

Figure 12:
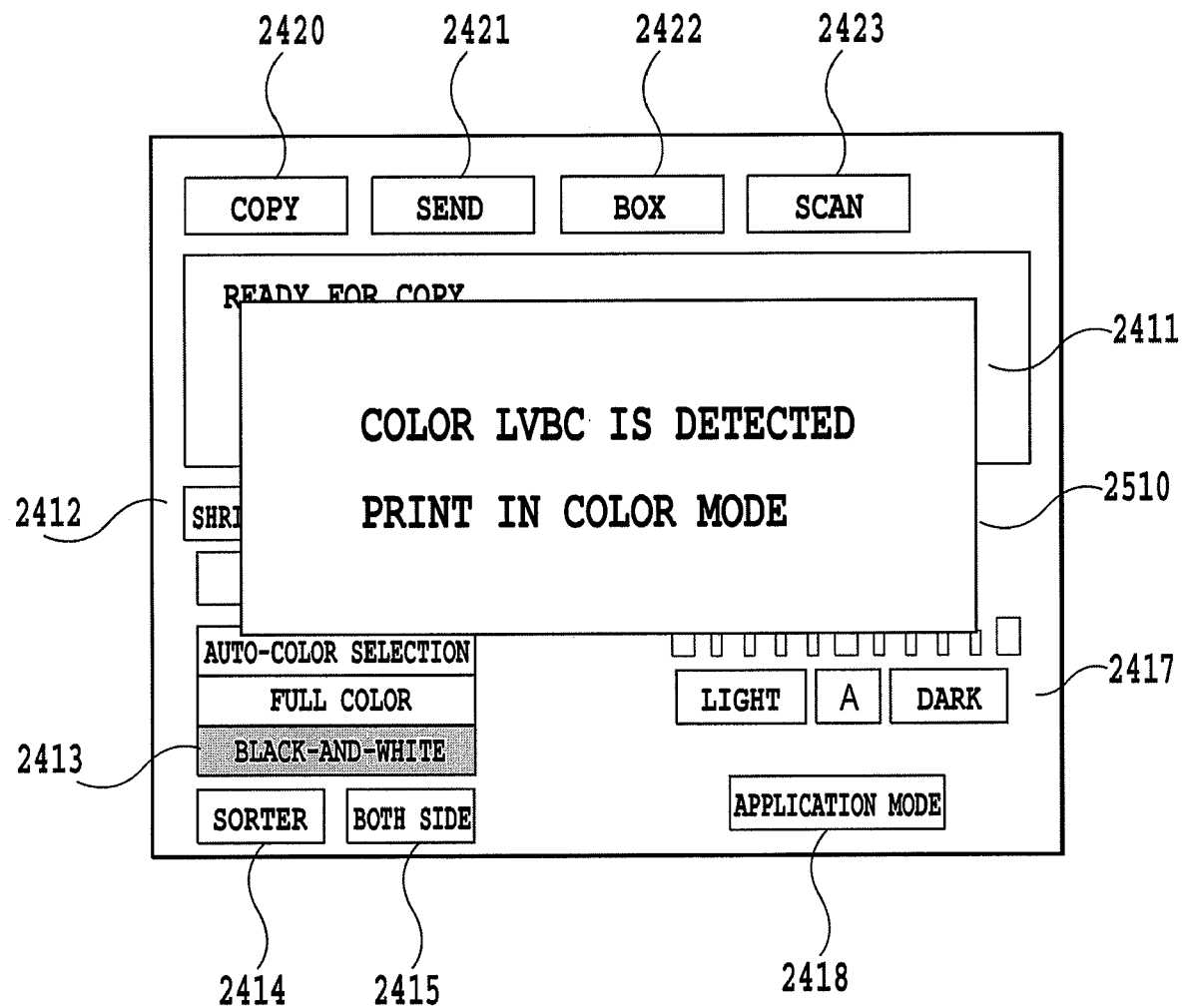
FIG. 12 is a diagram illustrating an example of a screen display in an image forming apparatus according to an embodiment of the present invention.

FIG. 12 is a diagram illustrating an example of a pop-up message box 2510 displayed on the LCD screen of the operation display part when the coded-information color determining part has determined that a color LVBC is embedded in a read document.

Display contents of the message box 2510 illustrates two messages that a color LVBC is detected and that printing is carried out in a color mode. That is, the image-output controlling part 1002 performs a control to output a color copy despite the setting of black-and-white copy output.

<Explanation of the Operation Part Screen Display [4]>

Figure 13:
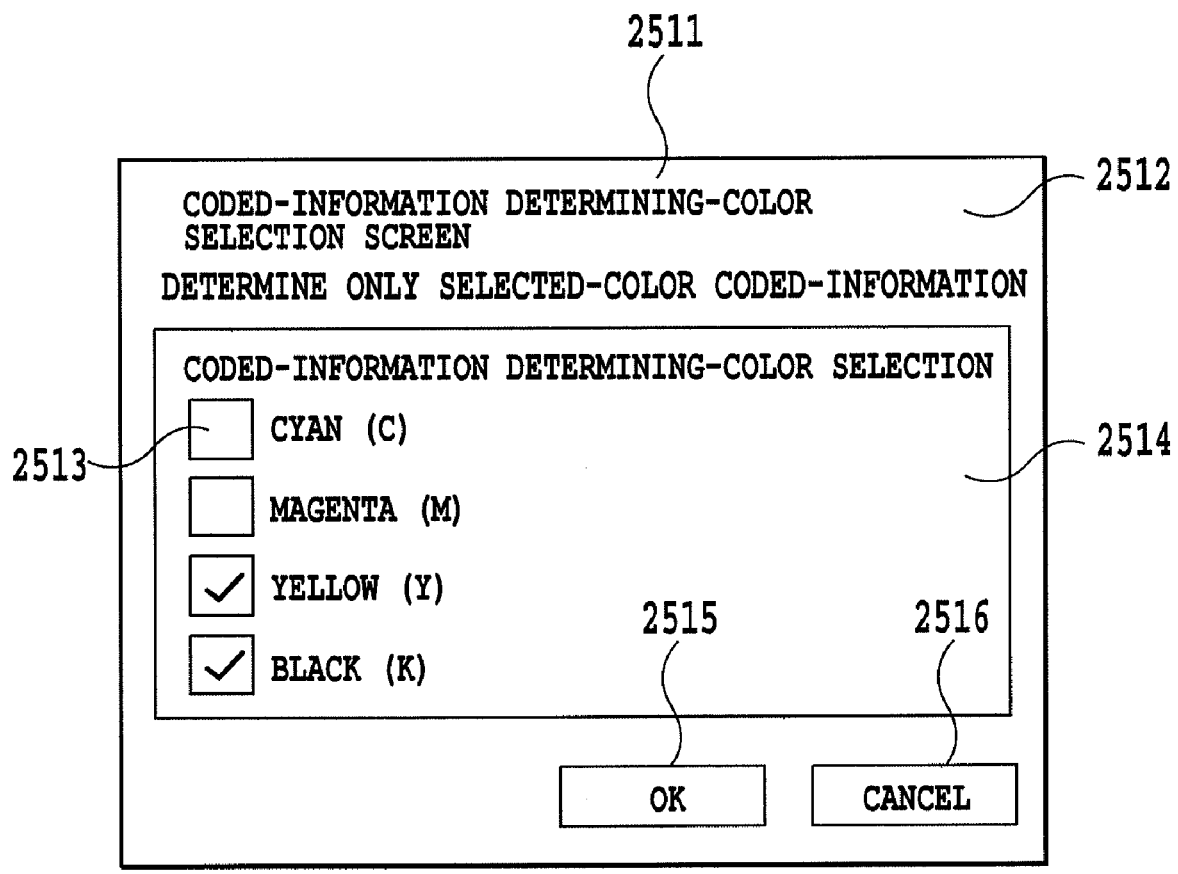
FIG. 13 is a diagram illustrating an example of a screen display in an image forming apparatus according to an embodiment of the present invention.

FIG. 13 is a diagram illustrating an example of a screen for selecting a coded-information determining color. A coded-information determining-color selecting screen 2511 sets a reference color for determination (determining color) in the coded-information color determining part 1004. The color determination is not performed for a color which is not selected in this screen.

In FIG. 13, a selection box 2514 for selecting a determining color includes check boxes 2513 and a user selects a desired determining color from the check boxes. As shown in FIG. 13, when the user selects determining colors of Y and K in the selection box 2514, the image forming apparatus sets the selected Y and K for determining colors.

When the determining colors are selected in this manner, the coded-information color determining part 1004 determines regarding the coded information color whether only the determining colors selected by the user (input) are included in coded-information colors.

<Coded-Information Color Determining Part>

Figure 14:
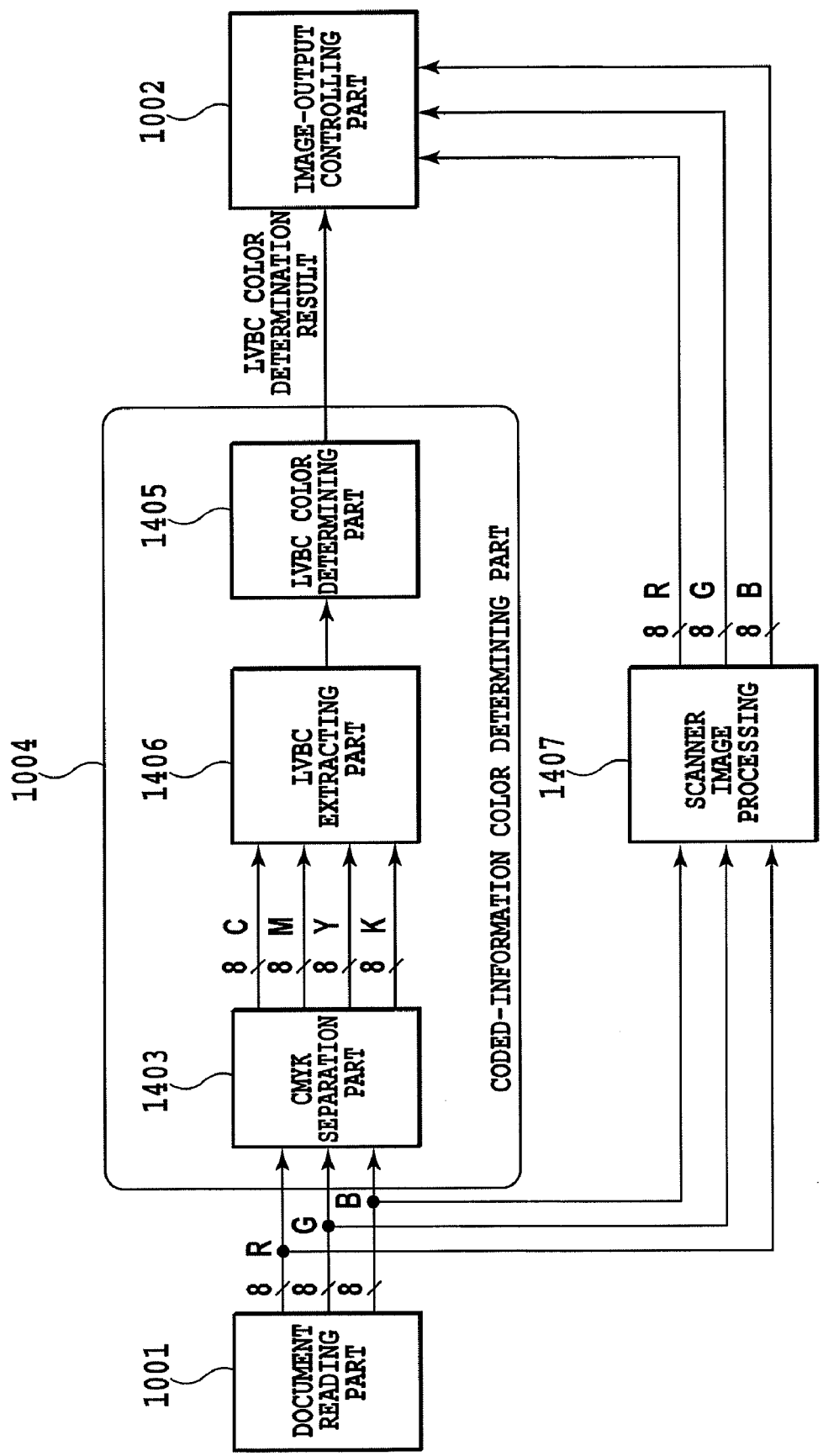
FIG. 14 is a diagram illustrating an example of a coded-information color determining part in an image forming apparatus according to an embodiment of the present invention.

FIG. 14 is a diagram illustrating a configuration of the coded-information color determining part 1004 in the image forming apparatus shown in FIG. 1.

The coded-information color determining part 1004 includes CMYK separation part 1403 converting an RGB signal into a CMYK signal, and an LVBC extracting part 1406 detecting a LVBC for each color and decoding the LVCB to extract information. Also, the coded-information color determining part 1004 includes an LVBC color determining part 1405 determining an LVBC color according to an LVBC extraction result for each color. Note that the function of the LVBC extracting part may be performed by the above mentioned embedded-information analyzing part 2001.

A document is read and converted into electronic data in the document reading part 1001 and eight bit luminance data for each R, G, and B color is input into the coded-information color determining part 1004. Meanwhile, there is a normal route for processing image data which provides scanner image processing 1407 such as well-known filter processing, input gamma correction processing, and the like.

The LVBC-color determining part 1405 determines that an LVBC detected in any of CMY colors is a color LVBC and that an LVBC detected only in K color is a black-and-white LVBC according to a result of extraction processing performed for each CMYK color by the LVBC extracting part 1406.

That is, document data read by the document reading part 1001 is input into the CMYK separation part 1403 as R, G, and B signals, and the CMYK separation part 1403 converts the input R, G, and B signals into C, M, Y, and K signals. The LVBC extracting part 1006 determines whether an LVBC exists in the read document using the above C, M, Y, and K signals, that is, extracts an LVBC from the read document. The LVBC color determining part 1405 determines the extracted LVBC colors and outputs a result of the determination to the image-output controlling part 1002. The coded-information color determining part 1004 determines whether color coded information exists in the read document and outputs a result of the determination in this manner.

<Operation Flow in the Image Forming Apparatus According to the Present Embodiment>

Figure 18:
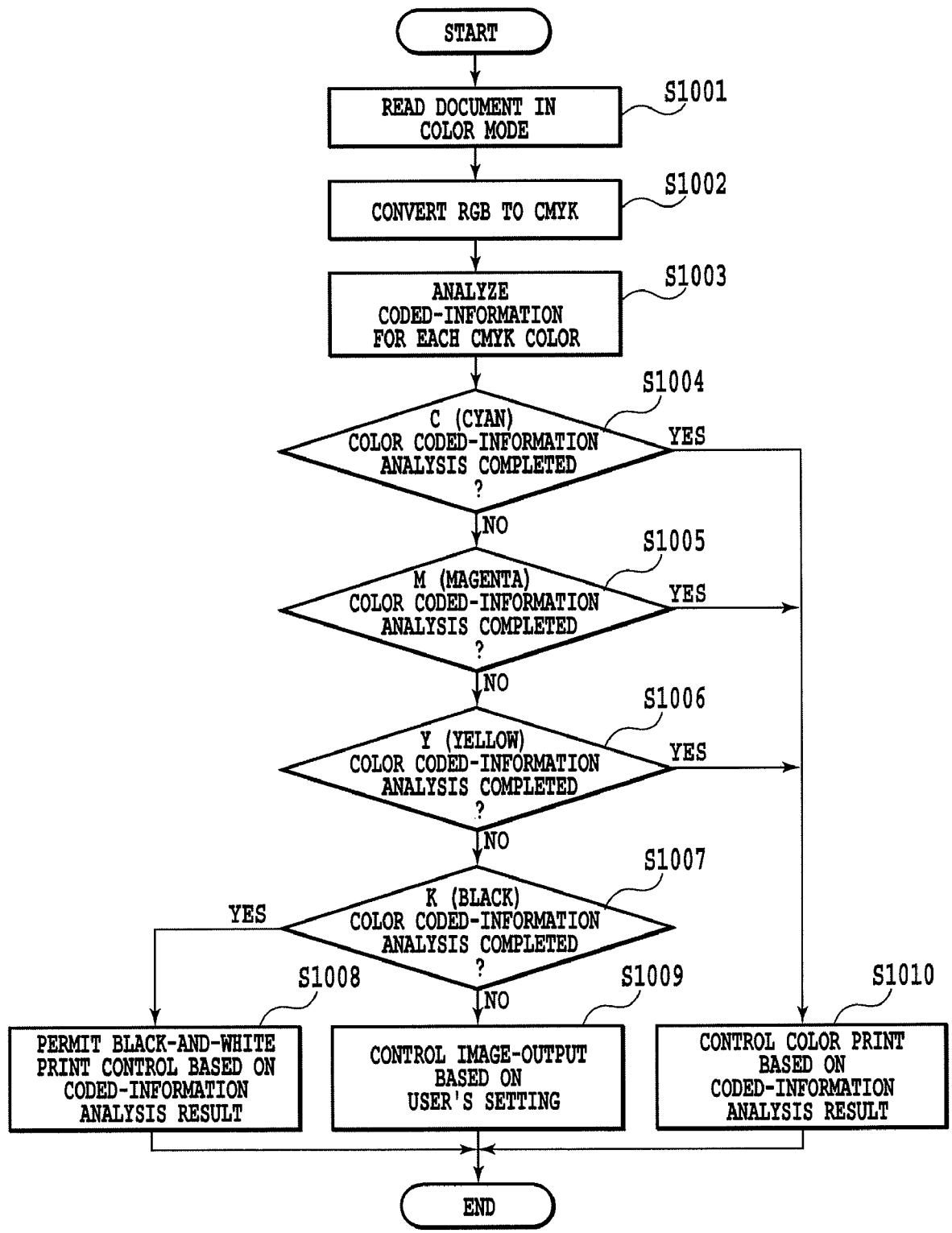
FIG. 18 is a flowchart illustrating an example of operation in an image forming apparatus according to an embodiment of the present invention.

FIG. 18 is a flowchart illustrating an example of operation in the image forming apparatus of the present invention. Here, Y and K are assumed to be set for the determining colors as shown in FIG. 13.

First, in Step S1001, the document reading part 1001 reads a document in a color mode (eight bits for each RGB color) and outputs RGB signals. Next, in Step S1002, the CMYK separation part (RGB/CMYK color space converting part) 1403 carries out CMYK conversion for the RGB signals which are electronic data converted from readout data. Then, in Step S1003, the LVBC extracting part 1406 and the LVBC color determining part 1405 analyze the data converted in the CMYK separation part 1403 for each CMYK color. In the data analysis, the LVBC extracting part 1406 first extracts and decodes coded information from the electronic data converted into the CMYK signals for each color. Then, the LVBC color determining part 1405 detects a color of the coded information extracted in the LVBC extracting part 1406.

Next, in Steps S1004 to S1007, the image-output controlling part 1002 determines whether the coded information is successfully detected and decoded individually for each CMYK color, according to an analysis result of the coded information. When the coded information has been successfully detected and decoded for any CMYK color in Steps S1004 to S1007, it is determined that color coded information is embedded. That is, in each step of Steps S1004 to S1007, the image-output controlling part 1002 determines whether the determining colors set in FIG. 13 are included in the colors of the detected coded information, according to the analysis result in S1003. When the determination result shows that the determining colors are included, it is determined that the coded information has been successfully detected and decoded and the process goes to Step S1010.

Since Y and K are set for the determining colors in the present embodiment, the image-output controlling part 1002 determines that the coded information can not be analyzed for C and M colors in Steps S1004 and S1005, respectively, and the process goes to Step S1006. In Step S1006, analysis result information regarding the analysis result in Step S1003 is analyzed and the process goes to S1010 when the coded information color is determined to be Y.

Subsequently, in Step S1010, the image-output controlling part 1002 performs a control of color printing and carries out color printing.

When the coded information is not detected nor decoded in any of CMY colors, the image-output controlling part 1002 determines whether the coded information has been detected and decoded in K color in Step S1007. If the coded information has been detected and decoded in K color, the image-output controlling part 1002 performs a control of controlling black-and-white printing in Step S1008. Here, in Step S1008, when "output color" is selected in the control selection box 2503 of FIG. 11, the image-output controlling part 1002 performs a control of carrying out color printing even if the color of the coded information is K.

If the coded information is not detected nor decoded even in K color in Step S1007, the coded information is determined not to be included in the document. In this case, the image-output controlling part 1002 provides an instruction to perform an image output control based on the user's setting to perform print control in S1009. Such cases include a case in which the color of the coded information is M but a determining color is set to be Y color, for example. In this case, the image-output controlling part 1002 performs a control carrying out color printing when "output color" is selected in the selection box 2503 of FIG. 11. On the other hand, when "permit black-and-white output" is selected in the selection box 2503 of FIG. 11, the image-output controlling part 1002 performs a control of black-and-white printing in a case the black-and-white output mode is selected by the color mode selection key 2413 in FIG. 10.

Note that a setting of "auto-color output setting" may be provided for the color mode selection key 2413 of FIG. 10 in the present embodiment. This auto-color output setting is a setting that the image forming apparatus performs color outputting of a read document when the document includes a color image and black-and-white outputting of a read document when the document does not include a color image.

When the auto-color output is set by the color mode selection key 2413 according to the present embodiment in this manner, the image forming apparatus performs color outputting in a case a read document includes a color image even though the document does not include color coded information. On the other hand, when the black-and-white output mode is selected by the color mode selection key 2413, the image forming apparatus according to the present embodiment performs black-and-white outputting in a case a read document does not include color coded information, even though the document includes a color image.

Hereinabove, the flowchart has been explained to show an example of the operation in the image forming apparatus according to the present embodiment. Note that the operation flow described above is an example showing the operation flow of the present invention and the operation flow of the present invention is not limited to this example as far as the operation flow includes the coded information analysis for each CMYK color in Step S1003 and the switching of the image output control based on this analysis result.

For example, instead of the decision by the determining color, the coded information color may be decided on the basis of a determination result by an auto-color selection function (ACS) determining automatically whether a read document is a color document or a black-and-white document. In this case, the coded information and the coded information color are extracted in Step S1003, and, at the same time, the image forming apparatus performs a determination of the read document by the auto-color selection function. When the document is determined to be a color document from the determination result, the coded information is determined to be color coded information, and when the document is determined to be a black-and-white document, the coded information is determined to be black-and-white coded information. In a case of the color coded information, the process may go to Step S1010, and in a case of the black-and-white coded information, the process may go to Step S1007. Also, in a case the document is determined to be an achromatic document by the auto-color selection function, the coded information color may be determined to be black-and-white.

Note that an important aspect of the present embodiment is to extract the coded information color and to set a print color automatically according to the coded information color. Accordingly, it may be sufficient for the present embodiment to be able to decide whether black-and-white printing is performed or color printing is performed according to the extracted coded information color, and the number of the determining color used for the decision may be any number. Accordingly, all of the C, M, Y, and K may be set for the determining colors in FIG. 13.

In the present embodiment, it is possible to decide appropriate print mode automatically according to the coded information color, and thereby it is possible to save an unnecessary operation like a resetting by a user for the appropriate print mode, to improve convenience for the user. Also, even in a case the print mode is set to a black-and-white output mode for reducing the TCO, the print mode is changed to a color output mode according to a result of determining the coded information color, when the color coded information is desired to be copied. Accordingly, the color coded information can be printed even in a black-and-white mode, and thereby it is possible to prevent a security hole from being caused while reducing the TCO.

Note that a case of copy printing is explained in the forgoing description. That is, it is determined whether the coded information exists in a read document which is read in the document reading part 1001, and if a color coded information exists therein, the read document is copied into a color output despite a black-and-white setting.

The present invention can be applied not only to the copy printing but also to simple printing. For example, in FIG. 1 or FIG. 14, the image data input into the coded-information color determining part 1004 may be transmitted from a printer driver of the PC 4011 or 4012.

Also, the present invention can be applied to a case of printing an image input from a removable storage medium such as a magnetic disk, an optical disk, or the like. In this case, the removable storage medium is inserted into a dedicated driver provided in the image forming apparatus, and the image forming apparatus obtains image data to be printed by reading the data from the storage medium. The image data may be input into the coded-information color determining part 1004.

Other Embodiments of the Present Invention

The present invention can be applied to a system comprised of a plurality of apparatuses (e.g. a computer, an interface device, a reader, a printer, or the like), or may be applied to apparatuses (a multifunctional apparatus, a printer, a facsimile machine, or the like) consisting of one device.

The scope of the above-described embodiments also includes a processing method, in which a program that operates the configuration of the above-described embodiments so as to achieve the functions of the embodiments is stored in a storage medium and the program stored in this storage medium is read as a code and a computer executes this code. That is, computer readable storage media also falls within the scope of the embodiments. Moreover, not only a storage medium, in which the above-described program is stored, but also the program itself falls within the scope of the above-described embodiments.

As such storage medium, for example, a floppy (registered trademark) disk, a hard disk, an optical disk, a magneto-optical disc, CD-ROM, a magnetic tape, a nonvolatile memory card, and ROM can be used.

Moreover, not only those for carrying out processes using only one program stored in the above-described storage medium but also those operating on an OS and executing the operations of the above-described embodiments in conjunction with other software or functions of an extension board also fall within the scope of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-123663, filed May 8, 2007, which is hereby incorporated by reference herein in its entirety.

What is claimed is:

1. An image outputting apparatus, comprising:
a setting unit which sets a black-and-white copy output upon receipt of an instruction from a user to output a black-and-white copy of a read document;
a determining unit which determines whether or not said read document includes color coded information; and
an outputting unit which outputs a color copy of said read document despite the setting of the black-and-white copy output by said setting unit when said determining unit has determined that said read document includes the color coded information.

2. The image outputting apparatus according to claim 1, wherein said determining unit includes:
an extracting unit which extracts said coded information from said read document; and
a color determining unit which determines a color of said extracted coded information.

3. The image outputting apparatus according to claim 2, wherein said outputting unit outputs a black-and-white copy of said read document when the color of said coded information has been determined to be black-and-white as a result of the determination by said color determining unit.

4. The image outputting apparatus according to claim 2, further comprising a unit which, according to an input from the user, decides an output color when said coded information is color coded information, and decides an output color when said coded information is black-and-white coded information.

5. The image outputting apparatus according to claim 2, further comprising a unit which performs a determination by an auto-color selection function based on said read document to decide a color of said coded information based on the determination result.

6. The image outputting apparatus according to claim 5, wherein said color of said coded information is determined to be black-and-white when the read document has been determined to be an achromatic document by said auto-color selection function.

7. The image outputting apparatus according to claim 2, wherein said color determining unit includes an unit which determines whether only a reference color, input by the user, for determining a color of said coded information is included in the color of said coded information.

8. A control method of an image outputting apparatus, comprising the steps of:
   setting a black-and-white copy output upon receipt of an instruction from a user to output a black-and-white copy of a read document;
   determining whether or not said read document includes color coded information; and
   outputting a color copy of said read document despite the setting of a black-and-white copy output performed in said setting step when said determining step has determined that said read document includes the color coded information.

9. A non-transitory storage medium storing a computer-readable program therein, the storage medium storing therein the program causing a computer to function as each of the units according to claim 1.

* * * * *